US007864880B2

(12) United States Patent
Giannakis et al.

(10) Patent No.: US 7,864,880 B2
(45) Date of Patent: Jan. 4, 2011

(54) BLIND SYNCHRONIZATION AND DEMODULATION

(75) Inventors: Georgios B. Giannakis, Minnetonka, MN (US); Xiliang Luo, Minneapolis, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 1355 days.

(21) Appl. No.: 11/243,454

(22) Filed: Oct. 4, 2005

(65) Prior Publication Data

US 2006/0083319 A1 Apr. 20, 2006

Related U.S. Application Data

(60) Provisional application No. 60/615,802, filed on Oct. 4, 2004.

(51) Int. Cl.
*H04L 27/00* (2006.01)
(52) U.S. Cl. .................. 375/295; 375/259; 375/296; 375/146; 375/135; 375/130
(58) Field of Classification Search .......... 375/259, 375/295, 296, 146, 135, 130
See application file for complete search history.

(56) References Cited

U.S. PATENT DOCUMENTS

| 5,852,630 | A * | 12/1998 | Langberg et al. ............ 375/219 |
| 5,892,792 | A * | 4/1999 | Walley ........................ 375/152 |
| 7,020,226 | B1 * | 3/2006 | Kirkland ...................... 375/355 |
| 7,106,814 | B2 * | 9/2006 | Carsello ....................... 375/343 |
| 7,236,544 | B2 * | 6/2007 | Williams et al. ............. 375/316 |
| 2003/0058963 | A1 * | 3/2003 | Cattaneo et al. ............. 375/316 |
| 2003/0165184 | A1 * | 9/2003 | Welborn et al. ............. 375/146 |
| 2003/0198308 | A1 * | 10/2003 | Hoctor et al. ............... 375/354 |
| 2004/0179631 | A1 * | 9/2004 | Nielsen ....................... 375/316 |
| 2005/0090274 | A1 * | 4/2005 | Miyashita ................... 455/502 |
| 2006/0187909 | A1 * | 8/2006 | Sho et al. .................... 370/389 |

OTHER PUBLICATIONS

A. Sendonaris et al., "User Cooperation Diversity—Part I: System Description," IEEE Transactions on Communications, vol. 51, No. 11, pp. 1927-1938, Nov. 2003.
A. Sendonaris et al., "User Cooperation Diversity—Part II: Implementation Aspects and Performance Analysis," IEEE Transactions on Communications, vol. 51, No. 11, pp. 1939-1948, Nov. 2003.

(Continued)

*Primary Examiner*—Shuwang Liu
*Assistant Examiner*—Kenneth Lam
(74) *Attorney, Agent, or Firm*—Shumaker & Sieffert, P.A.

(57) ABSTRACT

Techniques are described that provide inter-symbol interference—(ISI) and multi-user interference—(MUI) resilient blind timing synchronization and low complexity demodulation in wireless communication systems. A nonzero mean symbol is transmitted with a predetermined period in a stream of zero mean symbols during a synchronization phase. Only zero mean symbols are transmitted outside of the synchronization phase. Blind or non-data aided synchronization is performed at the receiver while bypassing channel estimation. The techniques enable timing synchronization via energy detection and low-complexity demodulation by matching the received waveform to a synchronized aggregate template (SAT). The SAT is recovered by averaging samples of the received waveform during the synchronization phase. In this manner, the described techniques may be applied to single or multi-user narrowband, wideband, or ultra-wideband (UWB) wireless communication systems with fixed or ad hoc access, but are particularly advantageous for wideband or UWB multi-user ad hoc access.

35 Claims, 14 Drawing Sheets

OTHER PUBLICATIONS

A.V. Dandawate et al., "Asymptotic Theory of Mixed Time Averages and Kth-Order Cyclic-Moment and Cumulant Statistics," IEEE Transactions on Information Theory, vol. 41, No. 1, pp. 216-232, Jan. 1995.

D. Porrat et al., "Bandwidth Scaling in Ultra Wideband Communication," Forty-First Annual Allerton Conference on Communication, Control and Computing, University of Illinois at Urbana-Champaign, Monticello, IL, Oct. 1-3, pp. 1104-1113, Oct. 2003.

E.A. Homier et al., "Rapid Acquisition of Ultra-Wideband Signals in the Dense Multi-Path Channel," IEEE Conference on Ultra Wideband Systems and Technologies, Baltimore, MD, pp. 105-109, May 20-23, 2002.

E.G. Strom et al., "Propagation Delay Estimation in Asynchronous Direct-Sequence Code-Division Multiple Access Systems," IEEE Transactions on Communications, vol. 44, No. 1, pp. 84-93, Jan. 1996.

G.B. Giannakis, "Filterbanks for Blind Channel Identification and Equalization," IEEE Signal Processing Letters, vol. 4, No. 6, pp. 184-187, Jun. 1997.

G.J. Pottie et al., "Wireless Integrated Network Sensors," Communications of the ACM, vol. 43, No. 5, pp. 51-58, May 2000.

G.T. Zhou et al., "A First-Order Statistical Method for Channel Estimation," IEEE Signal Processing Letters, vol. 10, No. 3, pp. 57-60, Mar. 2003.

IEEE P802.15 Working Group for WPANs, *Channel Modeling Sub-Committee Report Final*, IEEE P802.15-02/368r5-SG3a, pp. 1-40, Mar. 2004.

IEEE P802.15 Working Group for WPANs, *Time Variance for UWB Wireless Channels*, IEEE P802.15-02/461r1-SG3a, pp. 1-8, Nov. 2002.

J.C. Chen et al., "Source Localization and Beamforming," IEEE Signal Processing Magazine, vol. 19, No. 2, pp. 30-39, Mar. 2002.

J.N. Laneman et al., "Distributed Space-Time-Coded Protocols for Exploiting Cooperative Diversity in Wireless Networks," IEEE Transactions on Information Theory, vol. 49, No. 10, pp. 2415-2425, Oct. 2003.

L. Yang et al., "Blind UWB Timing with a Dirty Template," 2004 IEEE International Conference on Acoustics, Speech, and Signal Processing, pp. IV-509-IV512, Montreal, Quebec, Canada, May 17-21, 2004.

L. Yang et al., "Ultra-Wideband Communications: An Idea Whose Time has Come," IEEE Signal Processing Magazine, pp. 26-54, Nov. 2004.

M. K. Tsatsanis et al., "Blind Estimation of Direct Sequence Spread Spectrum Signals in Multipath," IEEE Transactions on Signal Processing, vol. 45, No. 5, pp. 1241-1252, May 1997.

V. Lottici et al., "Channel Estimation for Ultra-Wideband Communications," IEEE Journal Selected Areas in Communications, vol. 20, No. 9, pp. 1638-1645, Dec. 2002.

X. Luo et al., "Low-complexity Blind Synchronization and Demodulation for (Ultra-) Wideband Multi-User Ad Hoc Access," IEEE Transactions on Wireless Communications, vol. 5, No. 5, May 2006.

Z. Tian et al., "A GLRT Approach to Data-Aided Timing Acquisition in UWB Radios—Part I: Algorithms," IEEE Transactions on Wireless Communications, vol. 4, No. 6, pp. 2956-2967, Nov. 2005.

Z. Tian et al., "A GLRT Approach to Data-Aided Timing Acquisition in UWB Radios—Part II: Training Sequence Design" IEEE Transactions on Wireless Communications, vol. 4, No. 6, pp. 2994-3004, Nov. 2005.

Z. Tian et al., "BER Sensitivity to Mistiming in Ultra-Wideband Impulse Radios—Part I: Nonrandom Channels," IEEE Transactions on Signal Processing, vol. 53, No. 4, pp. 1550-1560, Apr. 2005.

Z. Wang et al., "Ultra Wide-Band Communications with Blind Channel Estimation Based on First-Order Statistics," Procedures of IEEE International Conference on ASSP, Montreal, Quebec, Canada, pp. IV-529-IV-532, May 2004.

Z. Wang et al., "Wireless Multicarrier Communications: Where Fourier Meets Shannon," IEEE Signal Processing Magazine, vol. 17, No. 3, pp. 29-48, May 2000.

Z. Xu, "Asymptotically Near-Optimal Blind Estimation of Multipath CDMA Channels," IEEE Transactions on Signal Processing, vol. 49, No. 9, pp. 2003-2017, Sep. 2001.

* cited by examiner

BLIND SYNCHRONIZATION AND DEMODULATION

This application claims priority from U.S. Provisional Application Ser. No. 60/615,802, filed Oct. 4, 2004, the entire content of which is incorporated herein by reference.

STATEMENT REGARDING FEDERALLY SPONSORED RESEARCH OR DEVELOPMENT

This invention was made with Government support awarded by ARL/CTA under Agency Grant No. DAAD 19-01-2-0011. The Government may have certain rights in this invention.

TECHNICAL FIELD

The invention relates to communication systems and, more particularly, transmitters and receivers for use in wireless communication systems.

BACKGROUND

In general, a receiver in a wireless communication system does not have a priori knowledge of the physical channel over which the transmitted signal propagates or the time at which a transmitter transmits the signal. Timing synchronization or acquisition, also known as clock recovery, is the process by which a receiver processes a received signal to determine the precise transition points within the received waveform. In other words, the receiver attempts to "synchronize" or align its clock with the clock of the receiving waveform. This process requires the receiver to estimate or otherwise determine the appropriate "timing offset" of the received signal, i.e., the amount of skew between the transmitter's clock and that of the arriving waveform.

Incorrect determination of the timing offset can have detrimental effects on the other receiver operations, such as channel estimation, symbol detection, and the like. For example, an incorrect timing offset may cause the received waveform to be sampled at times during which the waveform is in transition between two symbols resulting in an increased number of symbol detection errors. Thus, synchronization plays a critical role in ensuring reliable communications.

For example, in narrowband (NB) transmissions over additive white Gaussian noise (AWGN) channels, timing synchronization typically comprises "peak-picking" the correlation of the transmit-filter with its template formed at the receiver using a maximum likelihood (ML) or lower complexity sub-optimal, e.g., early-late gate, process. In wideband (WB) transmissions over frequency-selective channels which induce inter-symbol interference (ISI), timing acquisition can become more challenging, particularly in multiple access links which also experience multiuser interference (MUI). However, timing acquisition can be challenging with ISI even in single-user wireless links because the receiver-template must also account for the unknown multipath channel during the synchronization phase.

For this reason, data-aided algorithms relying on training symbols as well as non-data aided, i.e., blind or decision-directed, synchronizers attempt to jointly estimate the timing offset with the discrete-time baseband equivalent ISI channel. Furthermore, data-aided algorithms are bandwidth consuming and interrupt information transmission for training purposes while non-data aided synchronizers require relatively long data records to reliably estimate the statistics, such as sample cyclic correlations, used to estimate the timing offset.

Timing synchronization challenges are magnified in ultra-wideband (UWB) transmissions because the information-bearing waveforms are impulse-like and have lower power, which increases the difficulty in achieving accurate and efficient timing synchronization. Specifically, when ISI effects are particularly pronounced, the bit error rate (BER) may degrade severely due to mistiming and capacity may diminish when timing offset as well as channel coefficients and tap delays cannot be acquired.

Many UWB synchronizers rely on training, and some assume absence of inter-frame interference (IFI) and ISI, or, sampling rates as high as several GHz. Recently developed data aided and non-data aided algorithms for UWB receivers acquire timing via dirty-templates (TDT) formed from received noisy waveforms to cope with unknown channels inducing IFI but not ISI. These non-data aided TDT schemes require long data records and are available only for single-user links. In multi-access scenarios, the performance of such UWB receivers degrades significantly in the presence of ISI and MUI, even with data aided TDT.

Besides multi-access UWB links envisioned for wireless indoor pico-nets and potentially for low-power wireless sensor nets (WSN) outdoors, MUI constitutes a major performance-limiting factor when many asynchronous NB or WB communicators are to be synchronized, for example, at the base-station of a cellular code division multiple access (CDMA) system. Many blind CDMA approaches are sub-space-based and do not ensure identifiability of multipath channels and timing offsets in the presence of ISI and MUI. Moreover, data aided as well as blind synchronizers for WB-CDMA over ISI channels are considerably complex because the synchronizers must estimate each users' channels and timing offsets, while typically assuming knowledge of the underlying symbol periodic or long spreading codes. However, such an assumption, i.e., knowledge of spreading codes, may not be satisfied by several multi-access ad hoc protocols.

Thus, synchronization is a performance-critical factor in communication systems from classical NB, WB, and emerging UWB point-to-point links to cooperative or ad hoc networking, where access must deal with MUI and possibly severe ISI.

SUMMARY

In general, techniques are described that provide inter-symbol interference—(ISI) and multi-user interference—(MUI) resilient blind timing synchronization and low complexity demodulation in wireless communication systems. For example, the techniques transmit a nonzero mean symbol with a predetermined period in a stream of zero mean symbols during a synchronization phase. In some embodiments, only zero mean symbols are transmitted outside of the synchronization phase. Blind or non-data aided synchronization is performed at the receiver while bypassing channel estimation.

The techniques enable timing synchronization via energy detection and low-complexity demodulation by matching the received waveform to a synchronized aggregate template (SAT). The SAT is recovered by averaging samples of the received waveform during the synchronization phase. Decision directed algorithms may also be employed to track the estimated timing offset and SAT because the synchronization phase may comprise a relatively small fraction of the transmission time. In this manner, the described techniques may be applied to single or multi-user narrowband, wideband, or ultra-wideband (UWB) wireless communication systems with fixed or ad hoc access, but are particularly advantageous for wideband or UWB multi-user ad hoc access.

In one embodiment, the invention is directed to a comprising processing a data stream of information-bearing symbols to form nonzero mean symbols and zero mean symbols, transmitting a nonzero mean symbol with a predetermined period in a stream of zero mean symbols through a communication channel during a synchronization phase, and transmitting a stream of zero mean symbols through the communication channel outside of the synchronization phase.

In another embodiment, the invention is directed to a method comprising receiving a waveform through a wireless communication channel during a synchronization phase, wherein the received waveform comprises a periodic nonzero mean information-bearing symbol in a stream of zero mean information-bearing symbols, detecting energy of an average of the received waveform to form an estimate of the timing offset of the received waveform, estimating a synchronized aggregate template (SAT) based on the estimated timing offset, and outputting a stream of symbol estimates in accordance with the estimated timing offset.

In a further embodiment, the invention is directed to a transmitter comprising a pulse generator that processes a data stream of information-bearing symbols to form nonzero mean symbols and zero mean symbols, and one or more antennas to periodically transmit a nonzero mean symbol with a predetermined period in a stream of zero mean symbols during a synchronization phase, and to transmit a stream of zero mean symbols outside of the synchronization phase.

In an additional embodiment, the invention is directed to a computer readable medium comprising instructions that when executed in a transmitter process a data stream of information-bearing symbols to form nonzero mean symbols and zero mean symbols, periodically transmit a nonzero mean symbol with a predetermined period in a stream of zero mean symbols transmitted through a communication channel to a receiver during a synchronization phase, and transmit a stream of zero mean information-bearing symbols through the communication channel outside of the synchronization phase.

In yet another embodiment, the invention is directed to a receiver comprising an antenna to receive a waveform through a wireless communication channel during a synchronization phase, wherein the received waveform comprises a periodic nonzero mean information-bearing symbol in a stream of zero mean information-bearing symbols, an energy unit to detect energy of an average of the received waveform to form an estimate of the timing offset of the received waveform, a template unit to estimate a synchronized aggregate template (SAT) based on the estimated timing offset, and a symbol detector to output a stream of symbol estimates from the received waveform in accordance with the estimated timing offset.

In another embodiment, the invention is directed to a computer-readable medium comprising instructions that when executed in a receiver receive a waveform through a wireless communication channel during a synchronization phase, wherein the received waveform comprises a periodic nonzero mean information-bearing symbol in a stream of zero mean information-bearing symbols, detect energy of an average of the received waveform to form an estimate of the timing offset of the received waveform, estimate a synchronized aggregate template (SAT) based on the estimated timing offset, and output a stream of symbol estimates from the received waveform in accordance with the estimated timing offset.

The techniques described herein may offer one or more advantages. For example, periodically transmitting a nonzero symbol in a stream of zero mean symbols enables MUI- and ISI-resilient blind timing synchronization and low complexity. In particular, the techniques enable a SAT-based demodulator which, whether implemented digitally or as an analog filter, provides reliable demodulation without channel estimation. Consequently, the invention provides a receiver with improved robustness to timing error and lower complexity than a RAKE receiver. Specifically, a SAT-based receiver offers advantages over RAKE receivers in that the receiver asymptotically collects substantially all multi-path energy with low complexity and high robustness to timing error.

The techniques may also utilize decision directed tracking algorithms outside of a synchronization phase to track channel variations. The decision directed algorithms update the estimated timing offset and SAT based on a given number of received symbols. Accordingly, the number of symbols can be selected according to a trade-off among tracking, accuracy, and complexity.

Other advantages that may be provided by the described techniques include a selectable trade-off between performance and complexity. For example, maximum likelihood (ML) demodulation, such as Viterbi's algorithm, sphere decoding, or linear equalization may be selected for SAT-based demodulation depending on the application specific trade-off between bit-error rate (BER) performance and complexity. Moreover, the described techniques can be applied to single or multi-user fixed or ad hoc network employing narrowband, WB, or UWB communication protocols.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
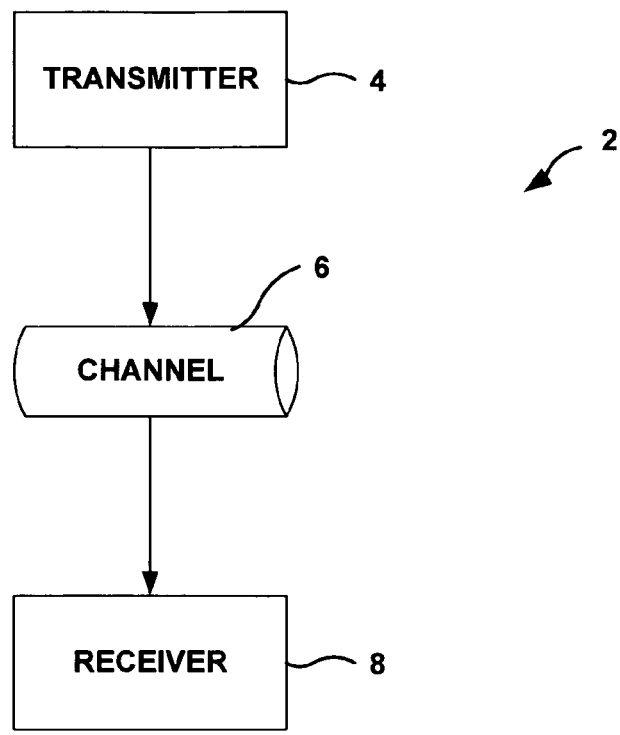
FIG. 1 is a block diagram illustrating a wireless communication system performing blind synchronization and low complexity demodulation in accordance with an embodiment of the invention.

FIG. 1 is a block diagram illustrating a wireless communication system 2 in which a transmitter 4 communicates with a receiver 8 through a wireless channel 6. Wireless communication system 2 may comprise a single or multi-user narrowband, wideband, or ultra-wideband (UWB) system (with a fixed or ad hoc architecture) and may be configured as a fixed or ad hoc network. Channel 6 may be frequency selective, i.e., may introduce ISI, as well as introduce additive white Gaussian noise (AWGN). In general, the techniques described herein provide a transmission protocol and receiver algorithms that enable wireless communication system 2 to perform inter-symbol interference—(IS) and multi-user interference—(MUI) resilient blind timing synchronization and low complexity demodulation. The transmission protocol is applied in transmitter 4 to transmit a synchronization pattern of nonzero mean symbols and zero mean symbols during a synchronization phase and only zero mean symbols outside the synchronization phase. The receiver algorithms are applied in receiver 8 to provide improved robustness to timing errors, performance, and lower complexity than a RAKE receiver.

Transmitter 4 transmits a nonzero symbol with a predetermined period in a stream of zero mean symbols during a synchronization phase. More specifically, transmitter 4 transmits nonzero mean symbols with a pried exceeding a known upper bound of the nonzero support of receiver 4 by a symbol period. The nonzero mean symbols induce cyclostationarity in the waveform that propagates through channel 6 to receiver 8. Outside of the synchronization phase, transmitter 4 transmits only zero mean symbols.

Receiver 8 utilizes low complexity energy detection to perform blind timing synchronization and recovers a continuous-time synchronized aggregate template (SAT) to perform low complexity demodulation while bypassing channel estimation. Receiver 8 recovers the SAT using the sample mean of the received waveform and the estimated timing offset generated by blind timing synchronization. Receiver 8 comprises a SAT-based demodulator that may be implemented digitally or as an analog filter that enables maximum likelihood (ML) optimal, such as Viterbi's algorithm, matched filter, or linear equalization to be invoked depending on the application specific trade-off between bit-error rate (BER) performance and affordable complexity. In particular, receiver 8 enables improved performance over a RAKE receiver because receiver 8 collects the full energy and, thus, multipath diversity, of channel 6, while a RAKE receiver can only approximate the full energy with increasing complexity, i.e., increasing number of fingers.

The techniques described herein may be applied to uplink or downlink transmissions, i.e., transmissions from a base station to a mobile device and vice versa. Transmitter 4 and receiver 8 may be any device configured to communicate using narrowband, wideband, or UWB transmissions including a distribution station, a hub for a wireless local area network, a mobile phone, a UWB radio, a laptop or handheld computing device, a personal digital assistant (PDA), a Bluetooth™ enabled device and other such devices. In particular, transmitter 4 and receiver 8 may include executable instructions and one or more processors, such as a general purpose processor or a digital signal processor (DSP), to implement the techniques described herein. The techniques may be implemented in hardware, firmware, software, or combinations thereof.

As described herein, transmitter 4 may comprise a single node in a fixed or ad hoc network transmitting a synchronization pattern of nonzero mean and zero mean symbols to receiver 8 while simultaneously communicating with other already synchronized nodes. Accordingly, the described techniques provide ISI- and MUI-resilient communication in fixed, e.g., cellular, architectures and ad hoc networks with cluster-heads or gateways acting as synchronizers. When implemented in cellular code-division multiple access (CDMA) systems, for example, transmitter 4 may comprise a base station that can synchronize one user at a time without pausing reception of other users in normal communication mode regardless of ISI. In a similar fashion, the described techniques may be particularly advantageous when imple-mented in ad hoc access systems, wireless sensor networks (WSNs), and other low cost wireless communication systems with limited resources. Specifically, the described techniques may be particularly advantageous in UWB multi-user ad hoc access systems because of the resulting low complexity blind synchronization and demodulation with resilience to ISI and MUI.

Figure 2:
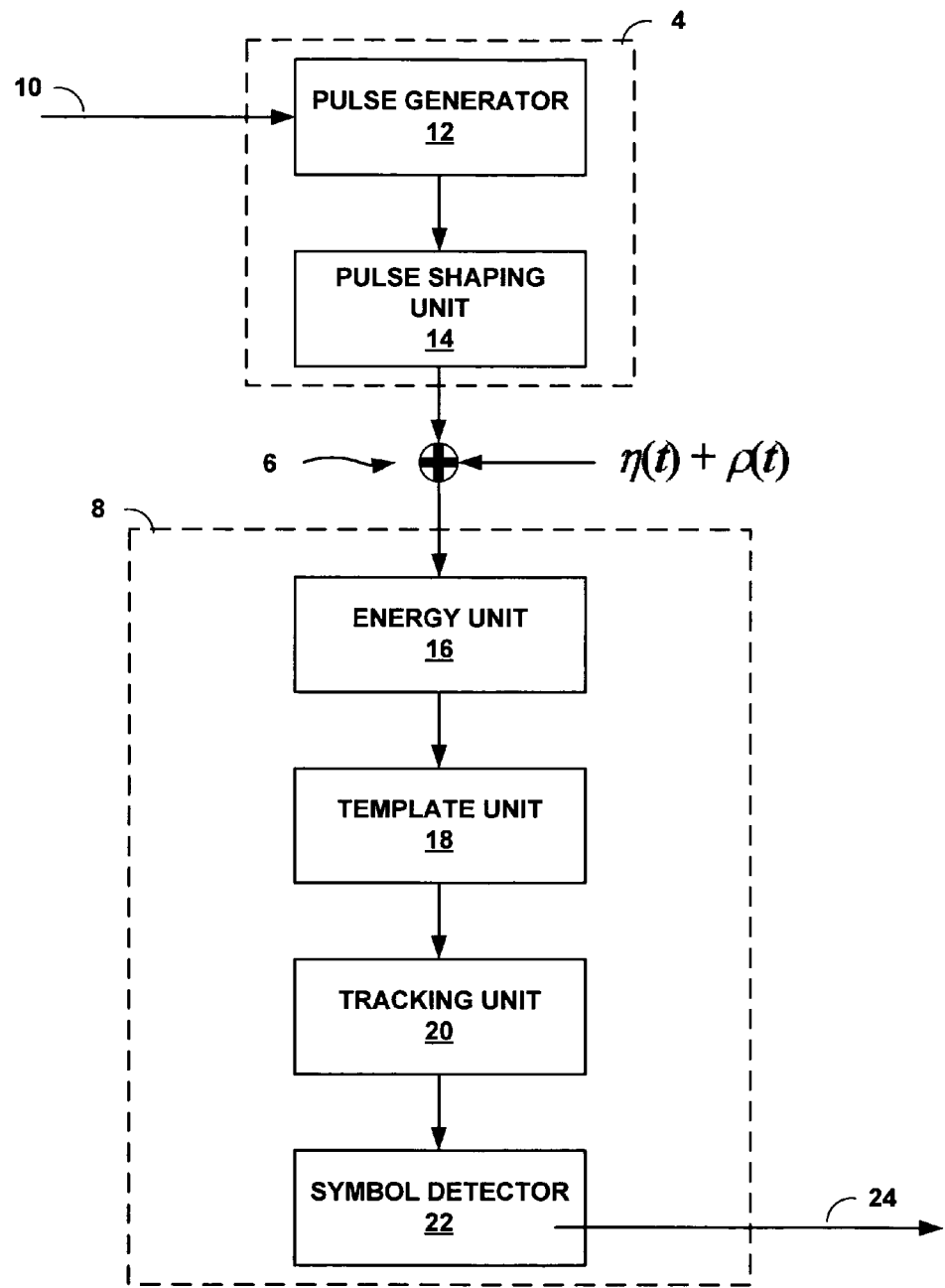
FIG. 2 is a block diagram illustrating an example embodiment of the wireless communication system of FIG. 1.

FIG. 2 is a block diagram illustrating in further detail transmitter 4 and receiver 8 of the exemplary wireless communication system 2. In general, transmitter 4 may comprise a node in an ad hoc network and includes pulse generator 12 and pulse shaping unit 14. Pulse generator 12 processes a data stream 10 of information bearing symbols s(n) to generate zero mean and nonzero mean symbols. Pulse shaping unit 14 linearly modulates the transmit pulse, i.e., spectral shaping pulse, $p_T(t)$ of duration $T_t \leq T_s$ to form a transmission waveform in accordance with the zero mean and nonzero mean symbols. The transmission waveform is a continuous time waveform carrying the pulse-shaped pulses through channel 6 and is given according to equation (1) with $\in$ representing the energy per symbol.

$$u(t) = \sqrt{\varepsilon} \sum_n s(n) p_T(t - nT_s) \quad (1)$$

The transmission waveform given in equation (1) may be intended for a single receiving node, such as a point-to-point link, or multiple receiving nodes and may be narrowband, wideband, or UWB. For example, equation (1) may describe a direct-sequence CDMA transmission waveform with spreading gain $N_c$, symbol-periodic spreading code $\{c_k\}_{k=0}^{N_c-1}$ and chip waveform p(t) of duration $T_c$. when $p_T(t) = \sum_{k=0}^{N_c-1} c_k p(t-kT_c)$ In this case, $T_T = T_s = N_c T_c$. In another example, the transmission waveform given in equation (1) may describe a UWB transmission waveform when $p_T(t) = \sum_{k=0}^{N_f-1} p(t-kT_f-c_kT_c)$ where p(t) represents a unit-energy pulse, i.e., a monocycle, of duration $T_p < T_c$ on the order of one nanosecond (ns), $T_f = N_c T_c$ is the duration of a frame comprising $N_c$ chips, $\{c_k\}_{k=0}^{N_f-1} \in [0, N_c-1]$ is a time hopping code shifting the pulse to user-specific positions, and $N_f$ is the number of frames or pulses per information-bearing symbol. In this case, $T_T = (N_f-1)T_f + c_{N_f-1}T_c + T_p \leq T_s = N_f T_f$. With respect to the time hopping code, $c_0 = 0$ to ensure that $\inf\{t | p_T(t) \neq 0\} = 0$ without loss of generality because $c_0 T_c$ can be incorporated into the unknown channel delay. In either case, CDMA and UWB transmission symbols may be selected with binary phase shift keying (BPSK) with s(n) taking ± values equiprobably.

Channel 6 may be a frequency-selective and, thus, ISI inducing multipath channel with impulse response $\Sigma_{l=0}^{L} \alpha_l \delta(t-\tau_l)$ where $\{\alpha_l\}_{l=0}^{L}$ and delays $\{\tau_l\}_{l=0}^{L}$ are assumed invariant over a block of symbols. The coherence time of channel 6 ($T_{coh}$) may satisfy $T_{coh} \gg T_s$. Letting $\tau_{l,0} := \tau_l - \tau_0$ isolates the direct-path delay $\tau_0$ which creates the timing offset between transmitter 4 and receiver 8. Consequently, channel 6 may be given according to equation (2).

$$h(t) = \sum_{l=0}^{L} \alpha_l \delta(t - \tau_{l,0}) \quad (2)$$

Channel 6 has support $[0, \tau_{L,0}]$ where the delay spread can be obtained through channel sounding. Channel- and transmit-filter effects are combined in the received symbol waveform $p_R(t)$ of duration $T_R:=\sup\{t|p_R(t)\neq 0\}$, where $p_R(t):=p_T(t)*h(t)=\Sigma_{l=0}^{L}\alpha_l p_T(t-\tau_{l,0})$ and "*" denotes convolution. As a result, the waveform received by receiver 8 may be represented as $u(t)*h(t-\tau_0)$ in the presence of MUI $\rho(t)$ and AWGN $\eta(t)$. The AWGN has two-sided power spectral density $N_0/2$ and bandwidth W dictated by the cutoff frequency of the low-pass front-end filter of receiver 8. Consequently, the waveform received by receiver 8 may be given according to equation (3).

$$r(t) = \sqrt{\varepsilon}\sum_n s(n)p_R(t-nT_s-\tau_0) + \rho(t) + \eta(t) \quad (3)$$

From equation (3), transmitter 4 employs a transmission protocol using a synchronization pattern enabling low-complexity blind estimation of $\tau_0$, $p_R(t)$, and detection of $s(n)$ in the presence of noise, MUI, and ISI. With respect to the transmission protocol, transmitter 4 uses the following conditions.

C1. Select the symbol period $T_s > \Delta\tau_{max}-T_T$, where $\Delta\tau_{max} \geq \max_{l\in[1,L]}(\tau_l - \tau_{l-1})$ represents a known upper bound on successive path delay differences.

C2. With delay spread $\tau_{L,0}$ and, thus, $T_R$ known, select an integer $M:=\lceil T_R/T_s \rceil + 1$.

C3. During a synchronization phase, transmit one nonzero mean symbol each M−1 zero mean symbols, i.e., for n=kM+m with m∈[0,M−1], the symbol stream $\{s(n)\}$ takes values from a finite alphabet with equiprobability according to $E[s(kM+m)]=\mu_0\delta(m)$ with $\mu_0 \neq 0$. Outside the synchronization phase, transmitter 4 transmits only zero mean symbols, i.e., $E[s(n)]=0 \forall n$.

C4. MUI and AWGN are zero mean, i.e., $E[\rho(t)]=E[\eta(t)]=0$, respectively.

Condition C1 ensures that over the interval $[0, T_R]$ support of $p_R(t)$, intervals where $p_R(t)$ are no larger than $T_s$. The upper bound for $\Delta\tau_{max}$ as well as the upper bound for $\tau_{L,0}$ can be found through sounding experiments. C2 relies on exact knowledge of $\tau_{L,0}$, however, the results derived in the description that follows carry over with an upper bound of $\tau_{L,0}$ as shown in Appendix A of G. B. Giannakis and X. Luo "Low-Complexity Blind synchronization and Demodulation for (Ultra-) Wideband Multi-User Ad Hoc Access," submitted to IEEE Transactions on Wireless Communications in September of 2004, which is incorporated herein by reference.

C3 specifies that a limited number of symbols, i.e., one out of M, with nonzero mean are transmitted during the synchronization phase. Otherwise, symbols are selected from zero mean constellations that are power efficient. In order to maintain the same demodulator in receiver 8 for zero mean and nonzero mean symbols, the amplitude of certain constellation points are minimally biased to generate nonzero mean symbols. In CDMA or UWB systems, for example, transmitter 4 may employ asymmetric BPSK with nonzero mean according to equation (4) where θ>1.

$$\mu_0 = E[s(kM)] = 0.5\theta + 0.5(-1) \quad (4)$$

If receiver 8 can only "hear" a single transmitter, i.e., transmitter 4, broadcasting the nonzero mean synchronization pattern, then C4 is satisfied regardless of how many zero mean interfering signals from other communicating nodes are present as is the case with star or clustered topologies of ad hoc networks where a single, but not always the same, node undertakes the task of synchronizing neighboring nodes.

Under C3 and C4, the mean of the received waveform in equation (3) is given according to equation (5). Because the mean of the received waveform is periodic with period $MT_s$, equation (5) establishes that $r(t)$ exhibits cyclostationarity also in its mean. A period of the received waveform can be estimated using the mean-square sense (mss) consistent sample average across N segments of $r(t)$ each of size $MT_s$. The mss average across N segments is give in equation (6).

$$Er(t) = \sqrt{\varepsilon}\mu_0 \sum_n p_R(t-nMT_s-\tau_0) \quad (5)$$

$$\bar{r}(t) = \frac{1}{N}\sum_{n=0}^{N-1} r(t+nMT_s), t \in [0, MT_s] \quad (6)$$

The description that follows demonstrates how to obtain $p_R(t)$ within a circular shift and subsequently resolve this shift to recover a SAT of $p_R(t)$ that allows low complexity demodulation.

C2 implies that over any interval of size $MT_s$, the mean of the received waveform in equation (5) contains a circularly shift copy of $p_R(t)$ by $\tau_0$ and has support $T_R \leq (M-1)T_s$. In particular, if $\tau_0$ is known, then the desired SAT would be readily obtained according to equation (7).

$$p_R(t) = \frac{1}{\sqrt{\varepsilon}}\frac{1}{\mu_0}Er(t+\tau_0), t \in [0, T_R] \quad (7)$$

To find $\tau_0$, the receiver 8 exploits the zero-guards of size $MT_s - T_R \geq T_s$ present in each period of $Er(t)$. Accordingly, let τ be a candidate shift, i.e., timing offset, which without loss of generality is confined to $[0, MT_s)$ per equation (5). With τ∈[0, $MT_s$), consider the objective function $J(\tau):=\int_0^{T_R}[Er(t+\tau)]^2 dt$ which, for the correct timing $\tau=\tau_0$, extracts the full energy of $p_R(t)$, i.e., $J(\tau_0) = \varepsilon\mu_0^2 E_R$ where $E_R:=\int_0^{T_R}p_R^2(t)gt$ represents the SAT energy. In the description that follows, we show that $\tau_0$ is the unique maximum of $J(\tau)$. For τ∈[0,$MT_s$), the integration in $J(\tau)$ over the interval of size $T_R$ will span at most two periods of $Er(t)$ because each period has size $MT_s > T_R$. Specifically, if $\tau > \tau_0$, only the periods corresponding to n=0,1 in equation (5) have nonzero contributions. Consequently, $J(\tau) = \varepsilon\mu_0^2[\int_0^{T_R}p_R^2(t+\tau-\tau_0)dt + \int_0^{T_R}p_R^2(t-MT_s+\tau-\tau_0)dt]$. In a similar fashion, if $\tau < \tau_0$, then n=−1, 0 which is completely analogous to the periods with $\tau > \tau_0$. For this reason, the subsequent steps of the proof for $\tau < \tau_0$ are omitted. With respect to $\tau > \tau_0$, $J(\tau) = \varepsilon\mu_0^2[\int_{\tau-\tau_0}^{T_R}p_R^2(t)dt + \int_0^{\tau-\tau_0-(MT_s-T_R)}p_R^2(t)dt]$ because $p_R(t)=0$ for $t \notin [0,T_R]$. $J(\tau)$ can be rewritten according to equation (8).

$$J(\tau) = J(\tau_0) - \int_{\tau-\tau_0-(MT_s-T_R)}^{\tau-\tau_0} p_R^2(t)dt \quad (8)$$

Because of C1, the integral in the right-hand-side of equation (8) is lower bounded for $\tau-\tau_0 > 0$ by the positive quantity $\int_{\tau-\tau_0-T_s}^{\tau-\tau_0} p_R^2(t)dt > 0$. This implies that for $\tau > \tau_0$, and likewise for $\tau < \tau_0$, $J(\tau) < J(\tau_0) \forall \tau \neq \tau_0$ and therefore the timing offset $\tau_0$ is given according to equation (9). Thus, the timing offset is the unique maximum of $J(\tau)$.

$$\tau_0 = \arg\max_{\tau \in [0, MT_s]} J(\tau) \quad (9)$$

$$J(\tau) := \int_0^{T_R} [Er(t+\tau)]^2 dt \quad (10)$$

Using equation (6) to replace ensemble—with sample-mean estimates in equations (9), (10), and (7) establishes the following result, stated in Proposition 1, that demonstrates blind synchronization and SAT recovery.

Proposition 1: Under C1-C4, the timing offset $\tau_0$ and the SAT $p_R(t)$ can be estimated blindly in the presence or absence of ISI and MUI according to equations (11) and (12), respectively, where the (mod $MT_s$) operation isused because $\bar{r}(t)$ in equation (6) is estimated over a period of size $MT_s$ whereas the integration in equation (11) requires its periodic extension.

$$\hat{\tau}_0 = \arg \max_{\tau \in [0, MT_s]} \int_0^{T_R} \bar{r}^2((t+\tau)_{mod\, MT_s}) dt \quad (11)$$

$$\hat{p}_R(t) = \frac{1}{\sqrt{\varepsilon}} \frac{1}{\mu_0} \bar{r}(t+\hat{\tau}_0), t \in [0, T_R] \quad (12)$$

In operation, energy unit 16 detects the energy of the received waveform to form an estimate of the timing offset in accordance with equation (11). Template unit 18 estimates the continuous-time SAT based on the estimated timing offset in accordance with equation (12).

As previously described, Proposition 1 may be applied to narrowband, wideband, and UWB systems in the presence or absence of ISI and/or MUI with fixed or ad hoc access. In particular, only readily available upper bounds on channel parameters are required for low complexity blind estimation based on sample averaging and energy detection. In the ISI-free case, for example, the channel parameters $T_R \leq T_s$ and $M=2$ are sufficient. Notice that no available approach can acquire timing of UWB transmissions in the generic setting allowed herein. Neither information bearing transmission must be interrupted for training nor transmit-filters, channels, or spreading codes need to be known, as long the transmission remain invariant while averaging is performed in accordance with equation (6).

Relying on fractional sampling, cyclostationarity in the sampled correlation has long been exploited to blindly estimate the discrete-time equivalent aggregate channel that also includes the receive filter. However, such schemes are more complex and require redundancy at the transmitter and, thus, are not bandwidth efficient. Lower complexity discrete-time alternatives relying on the cyclostationarity in the mean, however, may effect the nonzero mean via pulse position modulation in a UWB context or may utilize superimposed training symbols for blind estimation of discrete-time single-user channels and, thus, reduce power efficiency. In addition to being universally applicable to multi-access environments, the estimators given in equations (11) and (12) bypass channel estimation while blindly acquiring the timing offset and the continuous-time SAT.

Although training is to be avoided in ad hoc access, if available in a point-to-point link, M can be selected as an odd integer and the M-1 zero mean±1 symbols per synchronization period can be alternated so that the mean is deterministically zero. For a given accuracy, this will require a smaller N in the sample average in equation (6). Lowing N is also possible using a decision-directed (DD) version of Proposition 1. In this case, the M-1 zero mean estimated symbols inducing ISI can be annihilated from r(t) after SAT recovery and demodulation and an improved SAT estimate can be obtained as shown in a following description for DD algorithms utilized by receiver 8.

With the continuous-time SAT available, symbol detector 22 may be implemented as an analog or digital demodulator to output a stream of symbol estimates 28. When implemented as a digital demodulator, receiver 8 samples $\hat{p}_R(t)$ and r(t). However, receiver 8 may demodulate the received waveform using a SAT-based correlator to maintain the full energy in $p_R(t)$. Specifically, the SAT-based correlator is given according to equation (13) using $\hat{\tau}_0$ and $\hat{p}_R(t)$ obtained from equations (11) and (12), respectively. Substituting r(t) from equation (3), equation (13) can be re-written as given in equation (14) where $\tilde{\tau}_0 := \tau_0 - \hat{\tau}_0, \Phi_{\hat{p}_R p_R}(n;\tilde{\tau}_0) := \int_0^{T_R} \hat{p}_R(t)p_R(t-nT_s-\tilde{\tau}_0)dt, \eta(k;\tilde{\tau}_0) := \int_0^{T_R} \hat{p}_R(t)\eta(t+kT_s+\tilde{\tau}_0)dt$ and likewise for $\rho(k;\tilde{\tau}_0)$.

$$d(k) = \int_0^{T_R} \hat{p}_R(t) r(t+\hat{\tau}_0+kT_s) dt \quad (13)$$

$$d(k) = \sqrt{\varepsilon}\, \phi_{\hat{p}_R p_R}(0; \tilde{\tau}_0) s(k) + \quad (14)$$
$$\sqrt{\varepsilon} \sum_{n=-2(M-1), n\neq 0}^{2(M-1)} \phi_{\hat{p}_R p_R}(n; \tilde{\tau}_0) s(k+n) + \eta(k; \tilde{\tau}_0) + \rho(k; \tilde{\tau}_0)$$

Based on equation (14), Viterbi's algorithm (VA), sphere decoding, or linear equalization can be invoked depending on the application-specific trade-off between BER and affordable complexity. For example, in UWB receivers where sub-chip rate sampling is prohibitive, VA applied to equation (14) is the only ML optimal UWB receiver based on the symbol-rate samples in the absence of MUI.

To further reduce complexity, the ISI and MUI plus AWGN terms in equation (14) can be absorbed into a single colored noise term and receiver 8 can utilize a low complexity but sub-optimal slicer to demodulate the received waveform. In CDMA and UWB single- or multi-user access with binary symbol transmissions, this results in symbol detector 22 demodulating symbols with a sign detector as given in equation (15). The following proposition, i.e., Proposition 2, summarizes the SAT-based demodulation algorithms.

Proposition 2: Both during and after the synchronization phase, ML optimal, linear equalization and low complexity matched filter demodulators are available for demodulating s(k) from the decision statistic in equation (14) that is basd on the MUI- and ISI-resilient SAT and timing estimated blindly in accordance with C1-C4 in equations (11) and (12).

Besides its applicability to a wide range of scenarios discussed after Proposition 1, the SAT-based matched filter demodulator may be particularly advantageous. Specifically, the SAT-based matched filter demodulator offers a receiver with robustness, lower complexity, and better performance than a RAKE receiver which is typically chosen when ISI is present. With respect to the notation used herein, a RAKE receiver processes r(t) with the filter $\sum_{l=0}^{L_r} \hat{\alpha}_l p_T(t-\hat{\tau}_l)$ where $L_r+1$ represents the number of fingers of the receiver and $\{\hat{\alpha}_l, \hat{\tau}_l\}_{l=0}^{L_r}$ are estimated to approximate the dominant taps and delays of the unknown multipath channel 6. The SAT-based matched filter demodulator has lower complexity than a RAKE receiver because the SAT-based demodulator replaces costly estimation of $\{\hat{\alpha}_l, \hat{\tau}_l\}_{l=0}^{L_r}$ with a simple recovery of $\hat{\tau}_0$ and $\hat{p}_R(t)$ in accordance with equations (11) and (12) and, instead of $L_r$ correlators each with template $p_T(t)$ of duration $T_s$, equation (15) requires a single correlation with $\hat{p}_R(t)$ of duration $T_R$. The improved performance of the SAT-based demodulator stems from the SAT collecting the full energy and, thus, multipath diversity, of channel 6 while a RAKE receiver can only approximate the multipath diversity of channel 6 with increasing complexity, i.e., as $L_r$ approaches L. Further, the SAT-based demodulator exhibits self-calibrating capability and robustness to transmit-receive filter mismatch because it does not require knowledge of $p_T(t)$. Both robustness and the low complexity features of the SAT-based demodulator are particularly attractive for UWB receivers where L can be in the order of hundreds and the impulse-like monocycles are vulnerable to transmitter-receiver mismatch.

The following provides a performance analysis of the described blind synchronization and low complexity demodulation techniques. The objective is to analyze the impact of $\hat{\tau}_0$ and $\hat{p}_R(t)$ have on the BER performance of the demodulator in equation (15). Starting with $\bar{r}(t)$ in equation (6), the conditions for applying the law of large numbers in A. V. Dandawate and G. B. Giannakis, "Asymptotic theory of miedtime averages and kth-order cyclic moment and cumulant statistics," IEEE Transactions on Information Theory, vol. 41, pp. 216-232, January 1995 are satisfied. Thus, $\bar{r}(t)$ is mss consistent, i.e., $\lim_{N\to\infty}\bar{r}(t) \equiv Er(t)$ for $t \in [0, MT_s]$. Since well behaved functions of consistent estimators are themselves consistent, the latter implies that $\lim_{N\to\infty}\hat{\tau}_0 \equiv \arg\max_{\tau \in [0,MT_s)}J(\tau):=\tau_0$ and $\lim_{N\to\infty}\hat{p}_R(t) \equiv p_R(t)$, meaning that of $\hat{\tau}_0$ and $\hat{p}_R(t)$ are indeed mss consistent. The implication is that for N sufficiently large, the SAT-based matched filter demodulator effectively operates with $p_R(t)$ and thus collects the full energy of the channel. This endows receiver 8 with asymptotic ML optimality when both MUI and ISI are absent, asymptotic optimality in the maximum signal-to-noise (SNR) sense when MUI is absent but ISI is present, and asymptotic optimality in the maximum signal-to-interference-plus-ratio (SINR) sense when both MUI and ISI are present. Because $L_r < L$, a RAKE receiver does not possess such asymptotic optimality due to the approximation involved. The following proposition summarizes the described performance analysis.

To further analyze the BER performance, we define the sample averages $\bar{\eta}(t)$, $\bar{\rho}(t)$, and $\{\bar{S}_m\}_{m=0}^{M-1}$ as $\bar{r}(t)$ in equation (6) after replacing $r(t)$ with $\eta(t)$, $\rho(t)$, and $s(nM+m)$, respectively, e.g., $\bar{s}_0 := N^{-1}\Sigma_{n=0}^{N-1}s(nM)$. Substituting equation (3) into equation (6) and using these definitions in accordance with Appendix B of G. B. Giannakis and X. Luo "Low-Complexity Blind synchronization and Demodulation for (Ultra-) Wideband Multi-User Ad Hoc Access," submitted to IEEE Transactions on Wireless Communications in September of 2004, which is incorporated herein by reference, shows that $\bar{r}(t)$ can be expressed according to equation (16) for sufficiently large N.

$$\bar{r}(t) = \sqrt{\varepsilon}\,\bar{S}_0[p_R(t-\tau_0) + p_R(t+MT_s-\tau_0)] + \bar{\eta}(t) + \bar{\rho}(t) + \sqrt{\varepsilon}\left(\sum_{m=1}^{M-1}\bar{S}_m\right)\sum_{k=0}^{2}p_R(t+(kM-m)T_s-\tau_0),\ t\in[0,MT_s] \quad (16)$$

There are two sources of error in equation (16). One source of error captures combined MUI plus AWGN effects while the other emerges due to finite averaging of N segments. Hereafter, MUI is viewed as part of the AWGN and the asymptotic BER analysis is pursued in two directions, i.e., when N is large and when the SINR is large. Because MUI is neither white nor Gaussian, the BER expression in the remained of this analysis should be viewed as optimistic bounds of the expected performance in practice. Simulations provided in FIGS. 6-14 quantify the BER performance.

For large sample performance, equations (11) and (12) are examined with large N. Although the offsets $\tau$ searched anywhere can be anywhere in $[0, MT_s]$, the mss consistency of $\hat{\tau}_0$ guarantees that for sufficiently large N, $|\tau_0-\hat{\tau}_0| \leq T_s$, i.e., $\hat{\tau}_0$ is sufficiently close to the true timing offset $\tau_0$. Similarly, the estimated SAT will satisfy $\hat{p}_R(t) = (\sqrt{\varepsilon}\mu_0)^{-1}Er(t+\hat{\tau}_0) = \Sigma_{k=-1,0\,or\,k=0,1}p_R(t+kMT_s-\tau_0+\hat{\tau}_0)$ with $t \in [0, T_R]$. But for $|\tau_0-\hat{\tau}_0| \leq T_s$, only the summand corresponding to $k=0$ contributes and $\hat{p}_R(t)$ can be expressed according to equation (17).

$$\hat{p}_R(r) = p_R(t-\tau_0+\hat{\tau}_0),\ t \in [0, T_R] \quad (17)$$

By using equation (17) in the correlation involved in equation (14) $\Phi_{p_R p_E}(n;\tilde{\tau}_0) = \int_0^{T_R} p_R(t-\tilde{\tau}_0)p_R(t-nT_s-\tau_0)dt$ is obtained. When $n \notin [-(M-2), M-2]$, $\phi_{p_R p_E}(n;\tilde{\tau}_0)=0$ while setting $n=0$ yields the energy captured by the estimated SAT that is defined as $E_c(\tilde{\tau}_0) := \int_0^{T_R} p_R^2(t-\tilde{\tau}_0)dt$ Recall that the noise subsumes MUI and sum in equation (14) as ISI(k). Consequently, the detection statistic implied by the mss consistency of $\tilde{\tau}_0$ and $\hat{p}_R(t)$ for sufficiently large N is given according to equation (18) where $\eta(k;\tau_0) := \int hd\ 0^{T_R} p_R(t-\tilde{\tau}_0)\eta(t+kT_s+\hat{\tau}_0 dt)$ is zero mean AWGN with variance $E_C(\tilde{\tau}_0)N_0/2$ in accordance with Appendix C of G. B. Giannakis and X. Luo "Low-Complexity Blind synchronization and Demodulation for (Ultra-) Wideband Multi-User Ad Hoc Access," submitted to IEEE Transactions on Wireless Communications in September of 2004, which is incorporated herein by reference. ISI(k) is a finite-valued random variable since it involves $2(M-2)$ random symbols. For example, if $s(n)$ is BPSK, then ISI(k) can take any of $2^{2(M-2)}$ equiprobable values, each corresponding to a different combination of the binary symbols $\{s(k+n), n \in [-M+2, M-2], n \neq 0\}$.

$$d(k) = \sqrt{\varepsilon E_c(\tilde{\tau}_0)}s(k) + ISI(k) + \eta(k;\tilde{\tau}_0) \quad (18)$$

The BER when demodulating $s(k)$ from the $d(k)$ in equation (18) can be evaluated in two steps. The first step involves finding the BER conditioned on each fixed value of the ISI(k) term. The second step involves averaging over all ISI(k) combinations. During the first step, ISI(k) is a constant and evaluating performance of the detection problem in equation (18) is straightforward. When $s(k)$ is binary, the solution is given by the well known simple closed-form in terms of the Gaussian tail function (Q) given in equation (19) where $A_{ISI}$ denotes the finite alphabet of the ISI(k) term and the averaging corresponds to the previously described second step. As a corollary of equation (19), we can set $M=2$ and find the BER for ISI-free case with BPSK according to equation (20).

$$P_e = \frac{1}{2^{2(M-2)}}\sum_{ISI(k)\in A_{ISI}} Q\left(\sqrt{\frac{2\varepsilon E_c}{N_0}} + \sqrt{\frac{2}{E_c N_0}}\,ISI(k)\right) \quad (19)$$

$$P_e = Q\left(\sqrt{\frac{2\varepsilon E_C}{N_0}}\right) \quad (20)$$

Although the explicit forms are shown here only for BPSK, the general result is set forth in the following proposition.

Proposition 4: For N large enough to ensure $|\tau_0-\hat{\tau}_0| \leq T_s$, the BER incurred by the SAT-based slicer given in equation (15) in the presence of zero-mean AWGN is computable and depends on the severity of ISI and energy captured by the estimated SAT. For binary constellations, the BER is given by equation (19) in the presence of ISI.

As shown, the BER is dependent on the energy capture $E_C(\tilde{\tau}_0)$ more than the accuracy of $\tilde{\tau}_0$. For example, even when the error $\tilde{\tau}_0$ is relatively high, if $E_C$ captures most of the $E_R$ energy, the resultant BER will be low. Consequently, reliable demodulation is achieved even when the timing error may be high.

With respect to high SINR performance, i.e., substantially free of MUI, ISI and AWGN, the following analysis isolates and studies separately the effect of finite averaging on BER of the sign detector in equation (15) which depends on $\hat{\tau}_0$ and $\hat{p}_R(t)$. Setting averages $\overline{\eta}(t)=\overline{\rho}(t)=0$ in equation (16), and since the ISI-free case C2 suggests M=2, $\bar{r}(t)$ can be simplified as shown in equation (21).

$$\bar{r}(t) = \sqrt{\varepsilon}\left[\overline{S}_0 \sum_{k=0}^{1} p_R(t+2kT_s-\tau_0) + \overline{S}_1 \sum_{k=0}^{2} p_R(t+(2k-1)T_s-\tau_0)\right] \quad (21)$$

The timing estimator in equation (11) uses $\bar{r}(t)$ to obtain $\hat{\tau}_0=\arg\max_{\tau\in[0,2T_s)}\bar{J}(\tau)$ where $\bar{J}(\tau):=\int_0^{T_R}\bar{r}^2((t+\tau)_{mod\ 2T_s})dt$. As a result, the shifted replicas of the SAT involved in $\bar{r}^2(t+\tau)$ are $\{p_R(t+iT_s+\tau-\tau_0)\}_{i=-1}^{3}$. Because both $\tau$ and $\tau_0$ belong to $[0, 2T_s)$, $\tau-\tau_0 \in(-2T_s,2T_s)$, which implies that the SAT replica corresponding to i=3 is shifted by $3T_s+\tau-\tau_0\in(T_s,5T_s)$ and, thus, falls out of the integration range in $\bar{J}(\tau)$ because $T_R\leq T_s$. Furthermore, even when the remaining SAT copies that have duration $T_R\leq T_s$ are at least $T_s$-apart. Consequently, the remaining SAT copies do not overlap and the square of their weighted sum in $\bar{r}^2$ equals the sum of their weighted squares. These considerations enable $\bar{J}(\tau)$ to be simplified according to equation (22).

$$\bar{J}(\tau) = \varepsilon \int_0^{T_R} \left[\overline{S}_0^2 \sum_{k=0}^{1} p_R^2(t+2kT_s+\tau-\tau_0) + \overline{S}_1^2 \sum_{k=0}^{1} p_R^2(t+(2k-1)T_s+\tau-\tau_0)\right]dt \quad (22)$$

The following shows that $\bar{J}(\tau)$ has a unique maximum at $\tau=\tau_0$ for any finite N. Assuming $\overline{S}_0^2>\overline{S}_1^2$, which even for moderate N will hold with high probability since $\overline{S}_0$ will approximate the nonzero mean $\mu_o$, whereas $\overline{S}_1$ will be close to zero as $\overline{S}_1$ corresponds to the average of zero mean symbols. Under this realistic assumption, recall that $\tau-\tau_0 \in(-2T_s,2T_s)$ and consider that $\tau-\tau_0 \in(0,T_s)$. Examining the integration range in equation (22) provides equation (23), which proves that $\bar{J}(\tau)$ is maximized at $\tau=\tau_0$ when $\tau-\tau_0 \in(0,T_s)$. It can also be shown that $\bar{J}(\tau)$ is maximized at $\tau=\tau_0$ for the other intervals in $(-2T_s, 2T_s)$ that $\tau-\tau_0$ belongs using similar arguments.

$$\bar{J}(\tau)\leq\varepsilon[\overline{S}_0^2\int_{\tau-\tau_0}^{T_R}p_R^2(t)dt+\overline{S}_1^2\int_0^{\tau-\tau_0}p_R^2(t)dt]\langle\varepsilon\overline{S}_0^2\int_0^{T_R}p_R^2(t)dt:=\bar{J}(\tau_0) \quad (23)$$

With the synchronizer yielding deterministically that correct timing offset for $\overline{S}_0^2>\overline{S}_1^2$, the SAT estimator in equation (12) for this high-SINR regime will be $\hat{p}_R(t)=(\overline{S}_0/\mu_0)p_R(t)$ and the decision statistic in equation (14) simplifies to $d(k)=(\sqrt{\varepsilon}E_R\overline{S}_0/\mu_0)s(k)$. With noise and interference absent, the only source of uncertainty in this simplified form of $d(k)$ is $\overline{S}_0$. In particular, for the sign detector in equation (15), an error occurs if a negative $\overline{S}_0$ alters the sign of $d(k)$, i.e., $P_e=\Pr(\overline{S}_0<0)$. This makes BER evaluation of the demodulator easy because the central limit theorem allows $\overline{S}_0$ to be considered as approximately Gaussian with known mean and variance, even for small sample sizes, e.g., $N\leq 20$. For the asymmetric BPSK paradigm, $E(\overline{S}_0)=(\theta-1)/2$ and $Var(\overline{S}_0)=N^{-1}[(\theta+1)/2]^2$. Using these parameters, the BER can be computed in closed form in terms of the Q-function as given in equation (24).

$$P_e \cong Q\left(\sqrt{N}\frac{\theta-1}{\theta+1}\right) \quad (24)$$

The following proposition summarizes the results for high SINR.

Proposition 5: As SINR goes to $\infty$, $\hat{\tau}_0$ in equation (11) approaches $\tau_0$. Both $\hat{\tau}_0$ and $\tau_0$ coincide deterministically even for small and finite N as long $\overline{S}_0^2>\overline{S}_1^2$. The approximate BER of the resultant sign detector can be computed and assumes the closed form given in equation (24) in the binary case.

The fact that the BER in equation (24) does not depend on $\sqrt{\varepsilon}E_R$ is not as surprising because infinite SINR is assumed. In contrast, the BER at high SINR can be lowered either through increasing the zero mean by choosing $\theta\gg 1$ to make the asymmetry stronger, or by longer averaging, i.e., selecting larger N, even when the asymmetry is minimal, i.e., small $\theta-1/\theta+1$ ratio.

The timing and SAT estimators given in equations (11) and (12), respectively, were obtained by exploiting the cyclostationarity enabled by the nonzero mean symbols during the synchronization phase. However, transmitter 4 may transmit in the synchronization phase for only a small fraction of the time, e.g., less than five percent, Because this span of zero mean symbols may well exceed the coherence time of channel 6, the need arises to track $\hat{\tau}_0$ and $\hat{p}(t)$ and develop adaptive demodulators capable of accounting for channel variations. Thus, receiver 8 may include tracking unit 20 which employs DD tracking algorithms for updating $\hat{\tau}_0$, $\tilde{p}_R(t)$, and $\hat{s}(k)$ every K symbols. The block size K is chosen relative to $K_{coh}$:=$\lceil T_{coh}/T_s\rceil$ depending on trade-offs among tracking, accuracy, and complexity. As with the delay spread, $T_{coh}$ is readily computable from an upper bound on the Doppler spread of channel 6 that is assumed available through channel sounding experiments. The second goal is to develop low complexity DD alternatives with improved performance during the synchronization phase.

Let us consider the cross-correlation $\phi_{sr}(t):=E[s(n)r(t+nT_s)]$ and substitute $r(t+nT_s)$ from equation (3). Because symbols $\{s(n)\}$ are zero mean and uncorrelated, $\phi_{sr}(t)$ can be expressed according to equation (25) where the mean-square $E[s^2(n)]$ coincides here with the symbol variance $\sigma_s^2=1$ for BPSK constellations. The equality within a scale of $\phi_{sr}(t)$ in equation (25) with a period of $E_r(t)$ in equation (5) proves readily a key result to be used outside of the synchronization phase. Specifically, the key result is that timing and SAT recovery in the presence of ISI and MUI is possible based on $\phi_{sr}(t)$. Because $\phi_{sr}(t)$ is dependent on $r(t)$ that is cyclostationary with period $T_s$, rather than $\bar{r}(t)$ which has period $MT_s$, the search for the maximum $\tau_0$ in equation (26) is confined without loss of generality in $[0, T_s)$.

$$\phi_{sr}(t) = \sqrt{\varepsilon}E[s^2(n)]p_R(t-\tau_0) \quad (25)$$

$$\tau_0 = \arg\max_{\tau\in[0,T_s]}\int_0^{T_R}\phi_{sr}^2(t+\tau)dt, \quad (26)$$

$$p_R(t) = \frac{1}{\sqrt{\varepsilon\sigma_s^2}}\phi_{sr}(t+\tau_0), t\in[0,T_R]$$

As with equation (6) if K symbols s(n) were available, mss consistent estimation of $\phi_{sr}(t)$ would have been possible using $K^{-1}\sum_{n=0}^{K-1}s(n)r(t+nT_s)$, $t\in[0,MT_s]$. Accordingly, the crux of DD tracking and adaptive demodulation algorithms is to have already detected symbols ŝ(n) replace s(n) in this sample average. With b indexing blocks of size K, n=bK=k with k ∈[0,K−1] and suppose that $\hat{\tau}_0^{(b-1)}$ and $\hat{p}_R^{(b-1)}(t)$ are available. Relying on these timing and SAT estimates, the bth block can be detected using equation (27).

$$\hat{s}(bK+k)=\text{sign}[\int_0^{T_R} \hat{p}_R^{(b-1)}(t)r(t+\hat{\tau}_0^{(b-1)}+(bK+k)T_s)dt], k \in [0,K-1] \quad (27)$$

Based on $\{\hat{s}(bK+k)\}_{k=0}^{K-1}$ decisions, the cross-correlation can be estimated in accordance with equation (28).

$$\hat{\phi}_{sr}^{(b)}(t) = \frac{1}{K}\sum_{k=0}^{K-1}\hat{s}(bK+k)r(t+(bK+k)T_s), t \in [0, MT_s] \quad (28)$$

If SAT information becomes outdated and an update is desired in the ensuing block b, the needed ensemble cross-correlation in equation (26) is replaced by its sample estimate in equation (38) to obtain equations (29) and (30) for estimating the timing offset and SAT, respectively. For the next iteration, b is incremented to b+1 and demodulation is performed using equation (27) or equations (27-30) when a ST is also needed.

$$\hat{\tau}_0^{(b)}(t) = \arg\max_{\tau \in [0,T_s)}\int_0^{T_R}[\hat{\phi}_{sr}^{(b)}(t+\tau)]^2 dt \quad (29)$$

$$\hat{p}_R^{(b)}(t) = \frac{1}{\sqrt{\varepsilon}\,\sigma_s^2}\hat{\phi}_{sr}^{(b)}(t+\hat{\tau}_0^{(b)}) \quad (30)$$

If a sufficiently large number of ŝ(bK+k) decisions are correct in equation (28), then $\hat{\phi}_{sr}^{(b)}(t)$ will converge in the mss to the true $\phi_{sr}(t)$ as K increases. Arguing as in the previously described large number performance analysis, this implies that the DD and SAT estimators in equations (29) and (30), respectively, are mss consistent as K→∞, which establishes that the MUI- and ISI-resilient DD demodulator in equation (27) has the asymptotic optimality properties summarized in Proposition 3 for the blind detector in equation (15).

In addition to tracking outside of the synchronization phase, the DD alternatives can also be used to substantially improve the performance of SAT recovery during synchronization. To prove, recall the synchronization pattern in C3 and consider the cross-correlation now defined as $\phi_{sr}(t):=E[s(kM)r(t+kMT_s)]$. Because the symbols s(kM) have nonzero mean, substituting r(t+kMT_s) from equation (3) results in the cross-correlation expressed according to equation (31) where we used that in addition to being mutually uncorrelated, {s(kM)} are uncorrelated with the zero mean symbols {s(kM+m)}$_{m=1}^{M-1}$ which annihilates the ISI, with the zero-mean ρ(t) which suppresses MUI, and with the zero mean η(t) which mitigates AWGN. If the nonzero mean s(kM) are asymmetric BPSK symbols, then $E[s(kM)]=(\theta-1)/2$ and $E[s^2(kM)]=(\theta^2+1)/2$.

$$\phi_{sr}(t)=\sqrt{\varepsilon}E[s^2(kM)]p_R(t-\tau_0) \quad (31)$$

Compared with equations (25) and (5), $\phi_{sr}(t)$ in equation (31) shows an analogous form, except for a seemingly minor difference in the scaling factor. However, this analogy has three major implications. The first implication is that timing and SAT estimation, SAT-based demodulation, and their optimality summarized in Propositions 1-3 for the $\bar{r}(t)$ based algorithms apply to analogous schemes that become available via the mss consistent estimator $\hat{\Phi}_{sr}(t)=N^{-1}\sum_{n=0}^{N-1}s(nM)r(t+nMT_s)$. The second implication is that relative to $\bar{r}(t)$ based estimators in equations (11), (12), (14), and (15), the performance of those based on $\hat{\phi}_{sr}(t)$ is enhanced due to considerable SNR gains. In the binary case, this comes form the gain difference $(\theta^2+1)/2$ versus $(\theta-1)/2$ which increases SNR by a factor of $2(\theta^2+1)/(\theta-1)^2$. The third implication is that the corresponding algorithms based on $\hat{\phi}_{sr}(t)$ apply during the synchronization phase, not only when $\{\hat{s}(nM)\}_{n=0}^{N-1}$ are known through training, but also iteratively in a DD mode using equations (27-30), where now the superscript "(b)" represents the iteration number.

These attractive features can be effectively attained in the DD synchronization phase even with a variant of the cross-correlation approach that has complexity as low as the $\bar{r}(t)$ approach. Let the subscript ±1 denote sign-only quantities, and consider the cross-correlation $\phi_{rs\pm}(t):=E[s_\pm(kM)r(t+kMt_s)]$ where for binary symbols $s_\pm(kM):=\text{sign}[s(kM)]$. Following the reasoning in deriving equations (25) and (31), it follows that $\phi_{rs\pm}(t)=\sqrt{\varepsilon}E[s_\pm(kM)s(kM)]p_R(t-\tau_0)$ where for asymmetric BPSK symbols $E[s_\pm(kM)s(kM)]=(\theta+1)/2$. The latter will increase SNR by a factor of $(\theta+1)^2/(\theta-1)^2$ when estimation of $\tau_0$ and $p_R(t)$ is aided by $s_\pm(kM)$.

Initialized with the $\bar{r}(t)$ based estimates $\hat{\tau}_0$ and $\hat{p}_R(t)$, the recommended DD algorithm for the synchronization phase first detects the nonzero mean symbols' sign according to equation (32). These $\{\hat{s}_\pm(nM)_{n=1}^{N-1}\}$ signs allow forming the sample correlation estimate according to equation (33). Because the multiplication per summand is just with a sign, the complexity in implementing $\hat{\phi}_{rs\pm}(t)$ is comparable to that of $\bar{r}(t)$ in equation (6), which is already very low.

$$\hat{s}_\pm(kM) = \text{sign}\left[\int_0^{T_R}\hat{p}_R(t)r(t+\hat{\tau}_0+kMT_s)dt\right] \quad (32)$$

$$\hat{\phi}_{rs\pm}(t) = \frac{1}{N}\sum_{n=0}^{N-1}\hat{s}_\pm(nM)r(t+nmT_s) \quad (33)$$

Similar to equations (29) and (30), the DD SAT estimates are given according to equations (34) and (35).

$$\tau_0^{dd} = \arg\max_{\tau \in [0,T_s)}\int_0^{T_R}[\hat{\phi}_{rs\pm}(t+\tau)]^2 dt \quad (34)$$

$$\hat{p}_R^{dd}(t) = \frac{1}{\sqrt{\varepsilon}\,\sigma_s^2}\hat{\phi}_{rs\pm}(t+\hat{\tau}_0) \quad (35)$$

Although iterations are possible, one DD suffices in practice and enables low complexity implementation. Proposition 6 summarizes the results of DD algorithms.

Proposition 6: Under C1-C4, block-adaptive DD timing estimation, SAT recovery and demodulation can be implemented outside the synchronization phase using equations (27-30) to track channel variations. During the synchronization phase, DD timing estimation, SAT recovery and demodulation enhance performance at low complexity especially when implemented using sign-only decision information as in equations (32-35). All DD algorithms enjoy the asymptotic optimality properties summarized in Proposition 3 for their non-DD counterparts.

Figure 3:
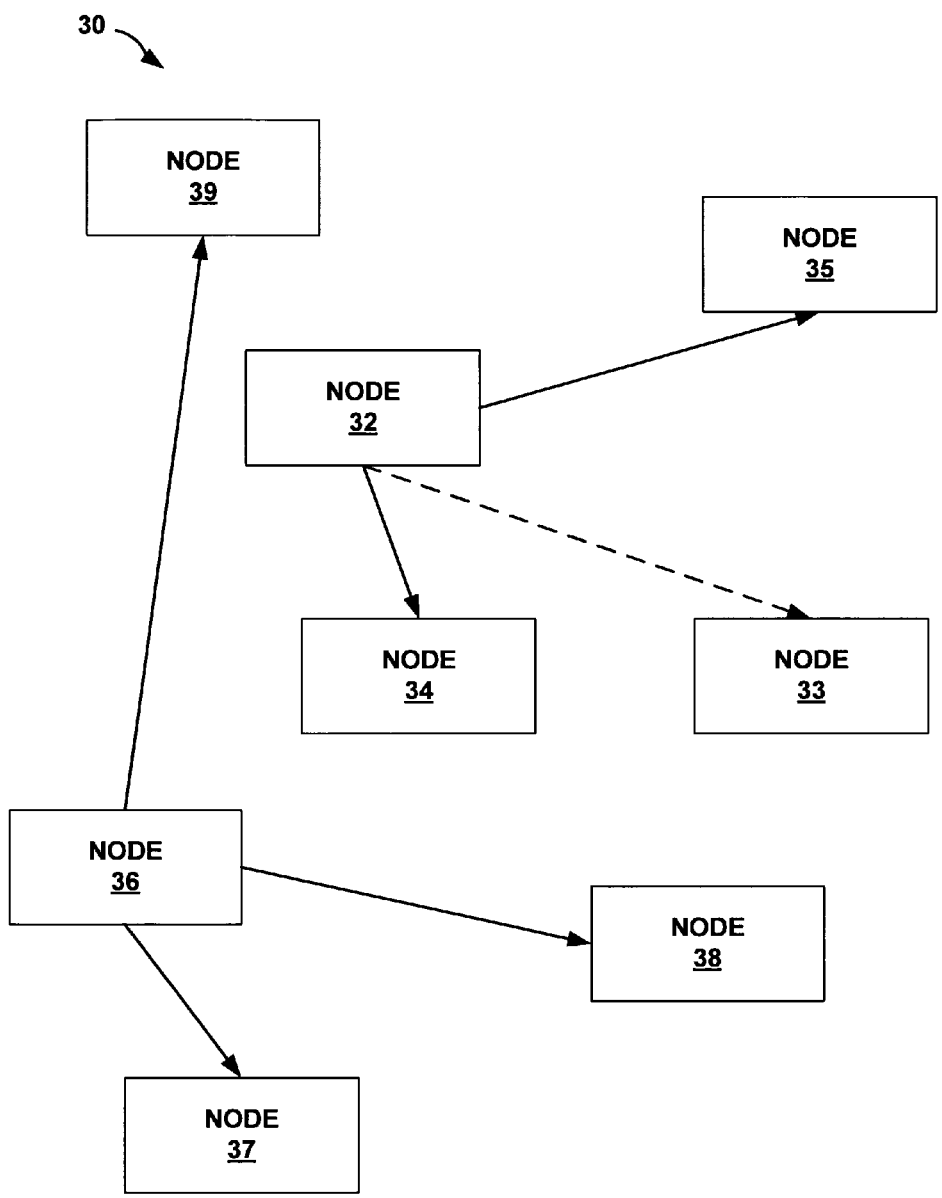
FIG. 3 is a block diagram illustrating a multi-user ad hoc access network operating in accordance with an embodiment of the invention.

FIG. 3 is a block diagram illustrating a multi-user ad hoc access wireless sensor network (WSN) 30 employing the previously described transmission protocol and receiver algorithms, i.e., blind synchronization and demodulation schemes. In particular, WSN 30 includes nodes 32-39. Nodes 32-36 comprise a first cluster in which node 32 broadcasts to nodes 33-35 while nodes 36-39 comprise a second cluster in which node 36 broadcasts to nodes 37-39.

In general, node 32 broadcasts to nodes 33-35 zero mean and nonzero mean symbols in accordance with a synchronization pattern during a synchronization phase. For example, node 32 may broadcast a nonzero mean symbol with a predetermined period in a stream of zero mean symbols during a synchronization phase. Outside of the synchronization phase, node 32 regularly broadcasts only zero mean BPSK symbols.

In the illustrated example, node 33 may initially operate in a "sleep mode." However, when node 33 "wakes up", node 33 begins averaging the waveform received from broadcasting node 32 according to equation (6) to form a mss sample $\bar{r}(t)$ across N segments of the received waveform. Because node 32 may broadcast the synchronization pattern over a small fraction of time, node 33 may wake up during a period which node 32 broadcasts only zero mean symbols. Thus, the $\bar{r}(t)$ collected by node 33 remains substantially zero until node 32 broadcasts the synchronization pattern. When node 32 does broadcast the synchronization pattern, the $\bar{r}(t)$ collected by node 33 is nonzero and node 33 performs blind synchronization and demodulation according to equations (11) and (12). Because of the design of equations (11) and (12), node 33 can effectively perform blind synchronization and demodulation even in the presence of MUI coming from nodes belonging to the same cluster, i.e., nodes 34 and 35, or nodes belonging to other clusters, i.e., nodes 36-39.

While node 33 synchronizes with broadcasting node 32, node 34 receives information without interruption and demodulates the information in accordance with equation (15). During the synchronization phase, node 34 does not change its demodulation scheme, but its BER improves when demodulating nonzero mean symbols because θ>1. In contrast, nodes belonging to other clusters or pico-nets, i.e., nodes 36-39, view broadcasting node 32 as MUI. Consequently, the BER of nodes 36-39 degrades when node 32 broadcasts nonzero mean symbols.

Figure 4:
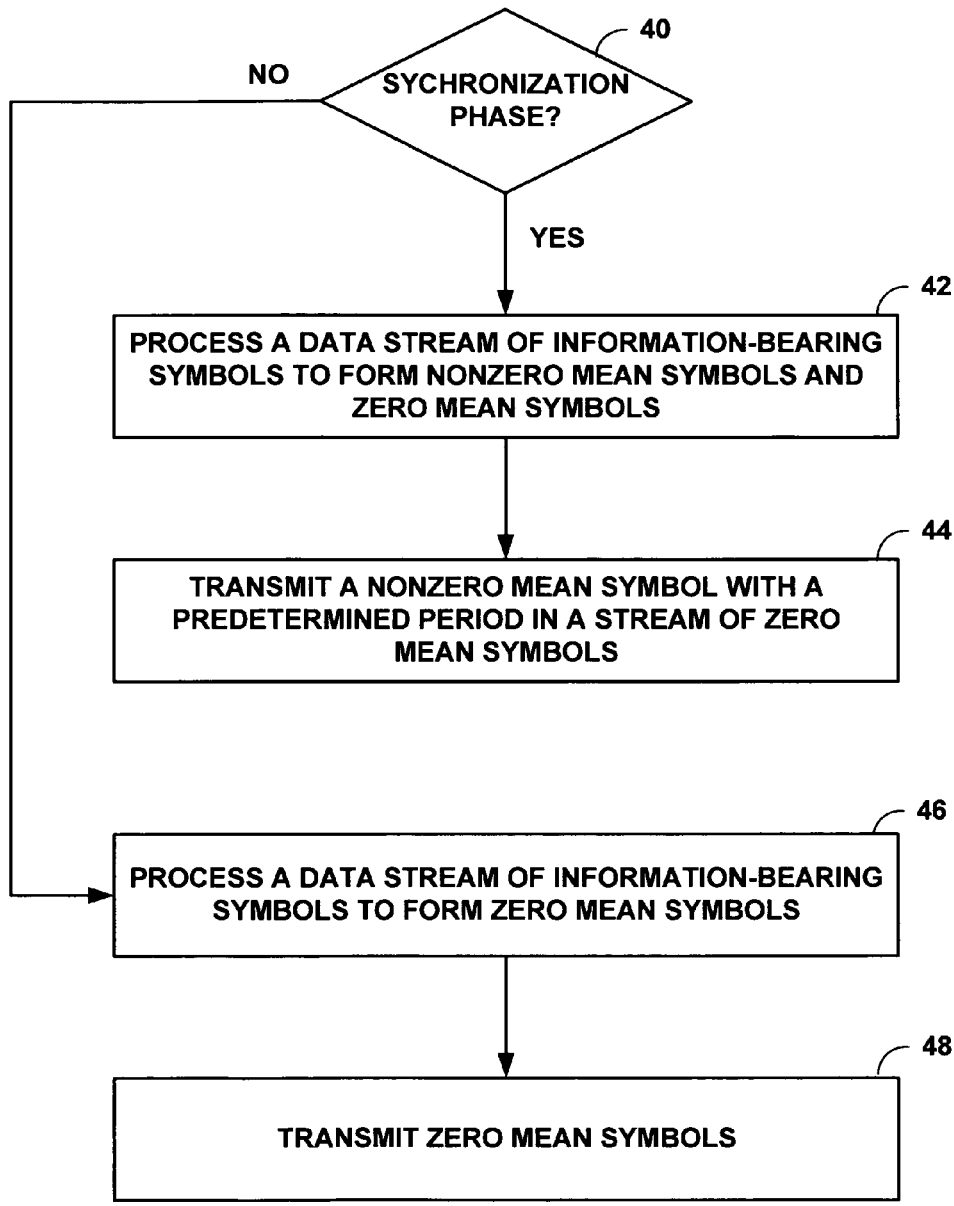
FIG. 4 is a flowchart illustrating example operation of a transmitter which transmits zero mean symbols and nonzero mean symbols in a synchronization phase and only zero mean symbols outside a synchronization phase.

FIG. 4 is a flowchart illustrating exemplary operation of transmitter 4. In general, transmitter 4 transmits zero mean and nonzero mean symbols in accordance with a synchronization pattern during a synchronization phase and transmits only zero mean symbols outside of a synchronization pattern. In particular, when operating in a synchronization phase (yes branch of 40), transmitter 4 processes a data stream of information-bearing symbols to form nonzero mean symbols and zero mean symbols (42). Transmitter 4 then transmits a nonzero mean symbol with a predetermined period in a stream of zero mean symbols (44) through channel 6. More specifically, transmitter 4 operates in accordance with C1-C4 during a synchronization phase.

When operating outside of a synchronization phase (no block of 40), transmitter 4 process a data stream of information-bearing symbols to form zero mean symbols (46) only. Transmitter 4 transmits the zero mean symbols (48) through channel 6. In this manner, the transmission waveform output by transmitter 4 during a synchronization phase is periodic.

Figure 5:
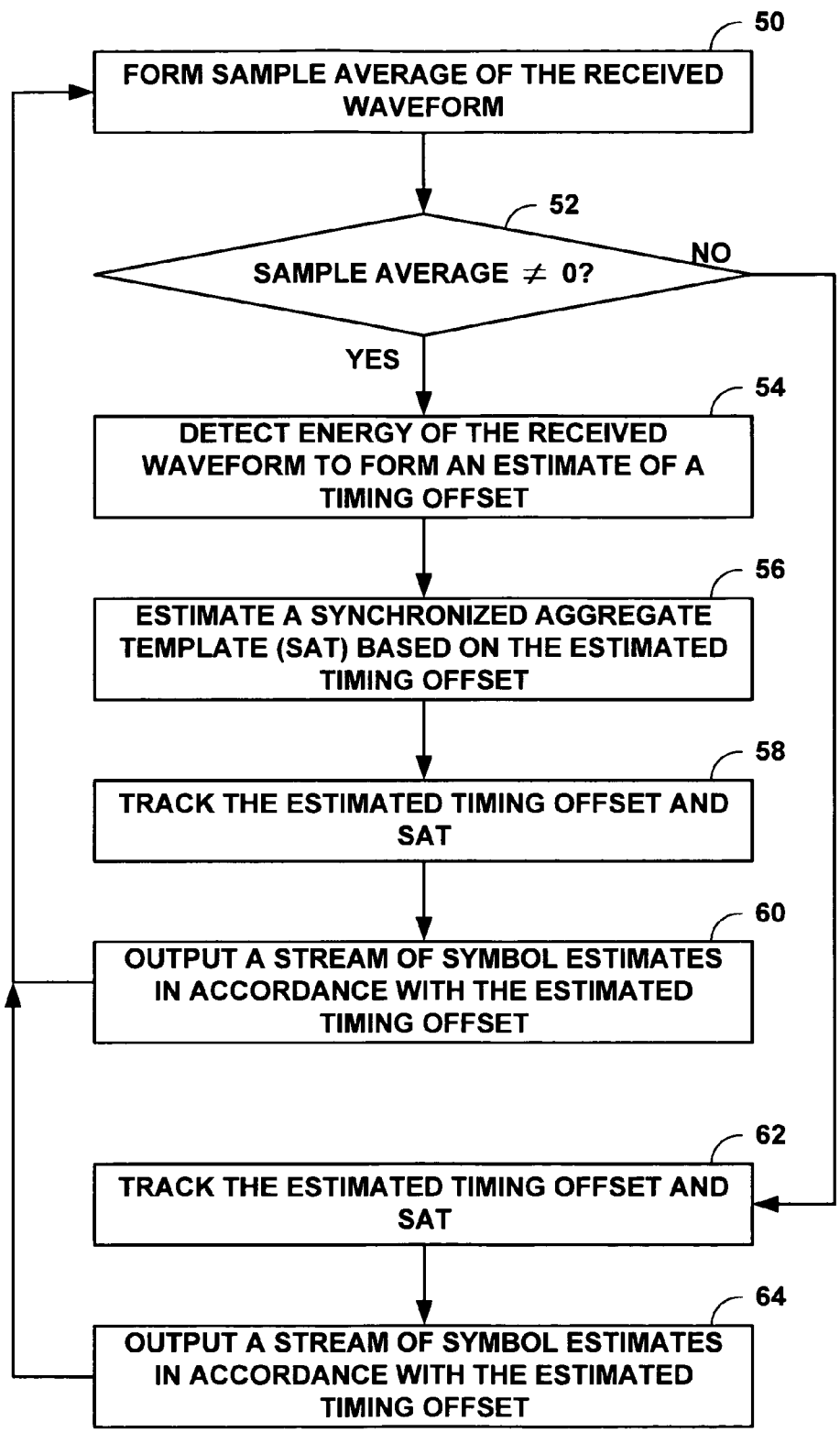
FIG. 5 is a flow chart illustrating example operation of a receiver that performs blind synchronization and low complexity demodulation in accordance with an embodiment of the invention.

FIG. 5 is a flow chart illustrating example operation of receiver 8. Initially, receiver 8 receives a waveform and forms a sample average of the received waveform (50), i.e., $\bar{r}(t)$, in accordance with equation (6). When the sample average is nonzero zero (yes block of 52) receiver 8 detects the energy of the received waveform to form an estimate of a timing offset (54) in accordance with equation (11). Receiver 8 also recovers the SAT based on the estimated timing offset (56) in accordance with equation (12). In this manner, receiver 8 bypasses channel estimation while acquiring the timing offset and a continuous-time SAT. Receiver 8 may then output a stream of symbol estimates in accordance with the estimated timing offset (60) in accordance with equation (15). Receiver 8 may invoke VA, linear equalization, or low a low complexity matched filter depending on the application-specific trade-off between BER and affordable complexity. In some embodiments, receiver 8 may also track the estimated timing offset and SAT (58) in accordance with the DD timing, SAT recovery, and demodulation equations (32-35) to enhance the performance at low complexity. In this case, receiver outputs a stream of symbol estimates (60) using sign only decision information.

On the other hand, when $\bar{r}(t)$ is substantially zero (no block of 52), receiver 8 may track the estimated timing offset and SAT (62) and output a stream of symbol estimates in accordance with the estimated timing offset (64) using the DD timing, SAT recovery, and demodulation equations (27-30).

Steps 54-60 and steps 62 and 64 may be iteratively performed as needed. In other words, receiver 8 may perform steps 54-60 during a synchronization phase and perform steps 62 and 64 outside of a synchronization phase.

FIGS. 6-14 are graphs that present simulations of the blind synchronization and low complexity demodulation techniques in equations (11), (12), (14), and (15) and their DD counterparts. In particular, the simulations focus on UWB systems with BPSK symbols which modulate the Gaussian or monocycle pulse shaper $p(t)=2\sqrt{e}A(t/\tau_g)\exp(-2t^2/\tau_g^2)$ with $\tau_g$=0.2 ns. For asymmetric BPSK, θ=3. the multipath channel is "CM 1" from the working group described in IEEE 802.15.3a Working Group for WPANs, Channel Modeling Sub-Committee Report Final, IEEE P802.15-02/368r5-SG3a, November 2002, having mean excess delay 4.9 ns and RMS delay spread 5 ns. Experiments have verified that the delay spread of CM1 is effectively upper bounded by 29 ns. After truncation to 29 ns, the channel is normalized to have unit power gain. Simulated performance curves are obtained by averaging 100 Monte Carlo runs.

Figure 6:
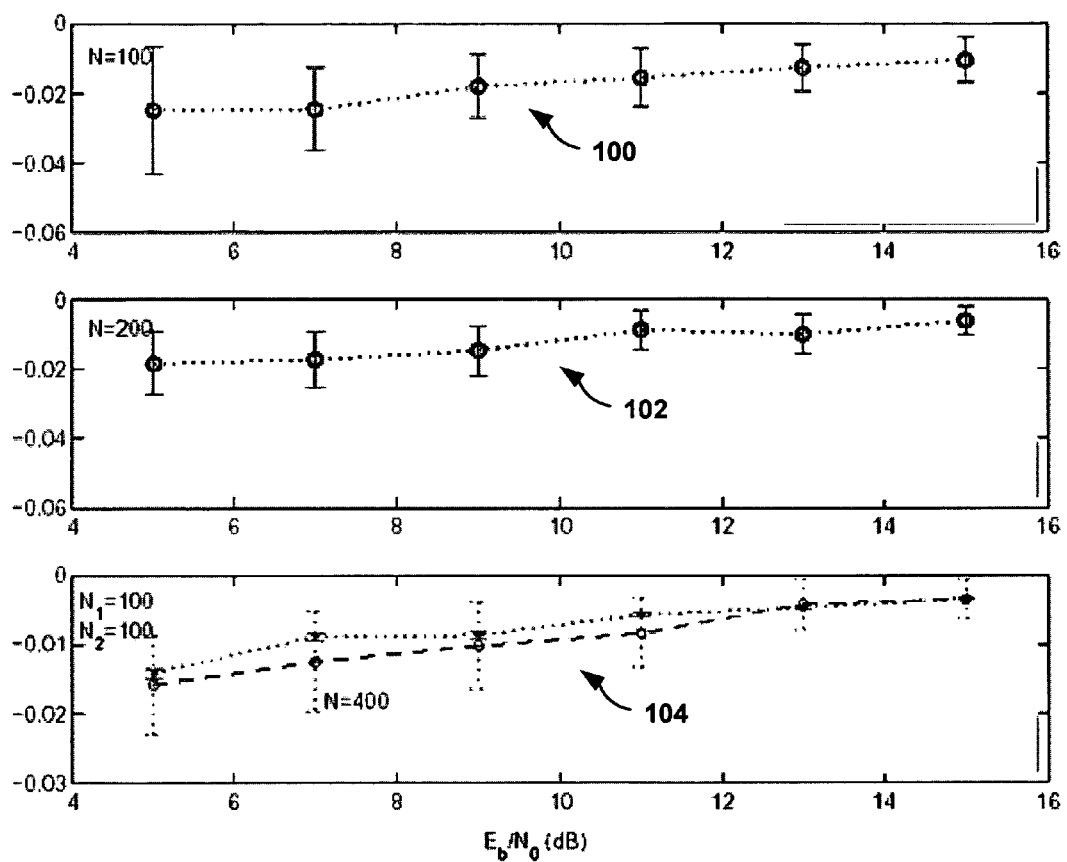
FIGS. 6-14 are graphs illustrating results of simulations and comparisons that validate analyses and designs of blind synchronization and low complexity demodulation.
Figure 7:
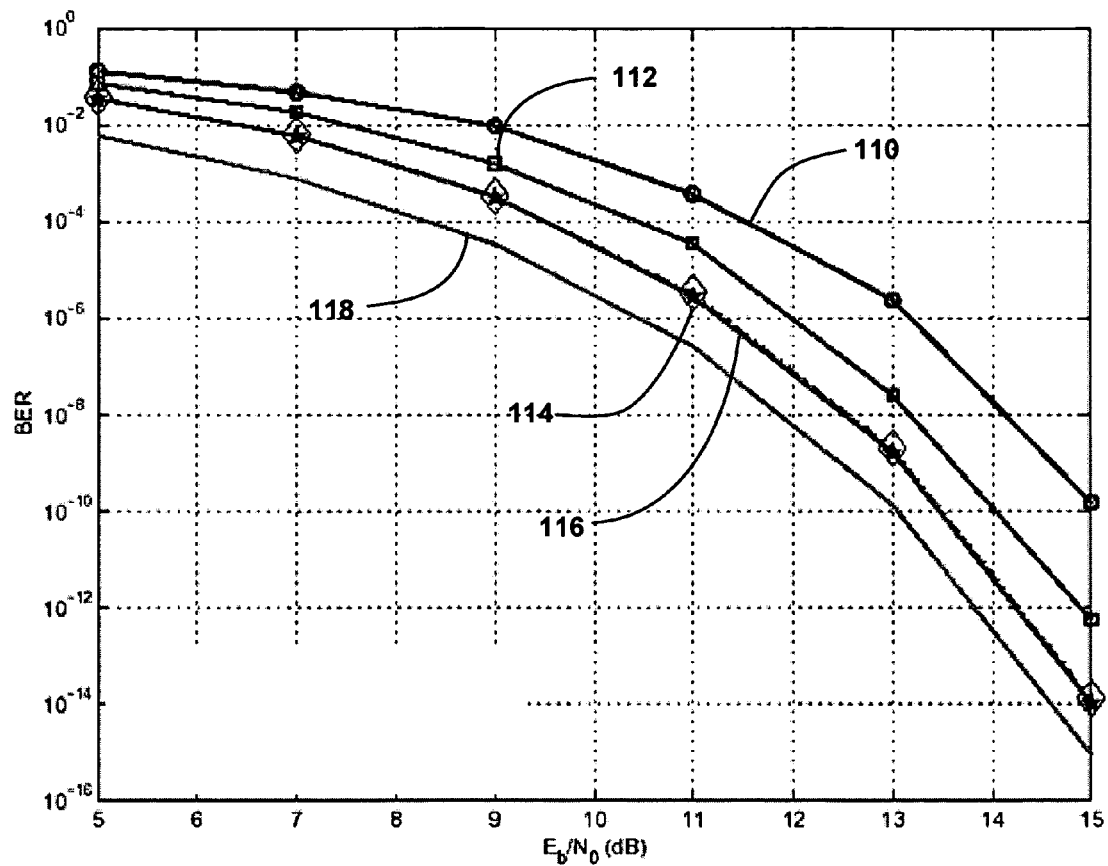
Figure 8:
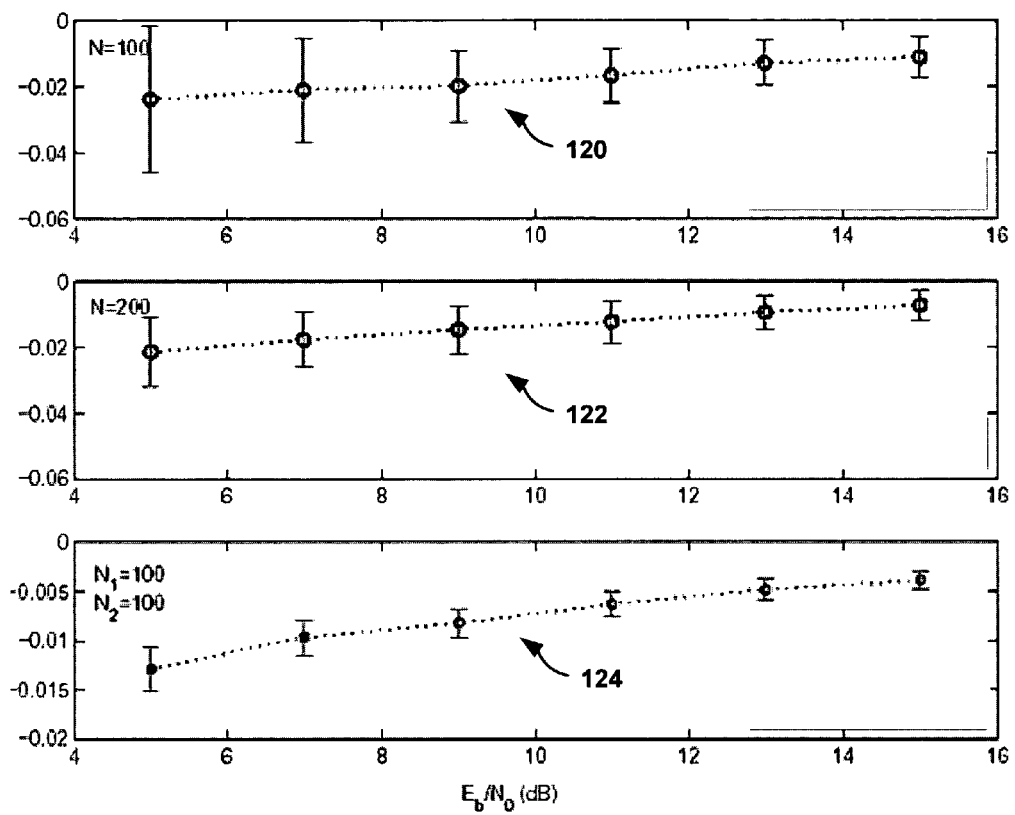
Figure 9:
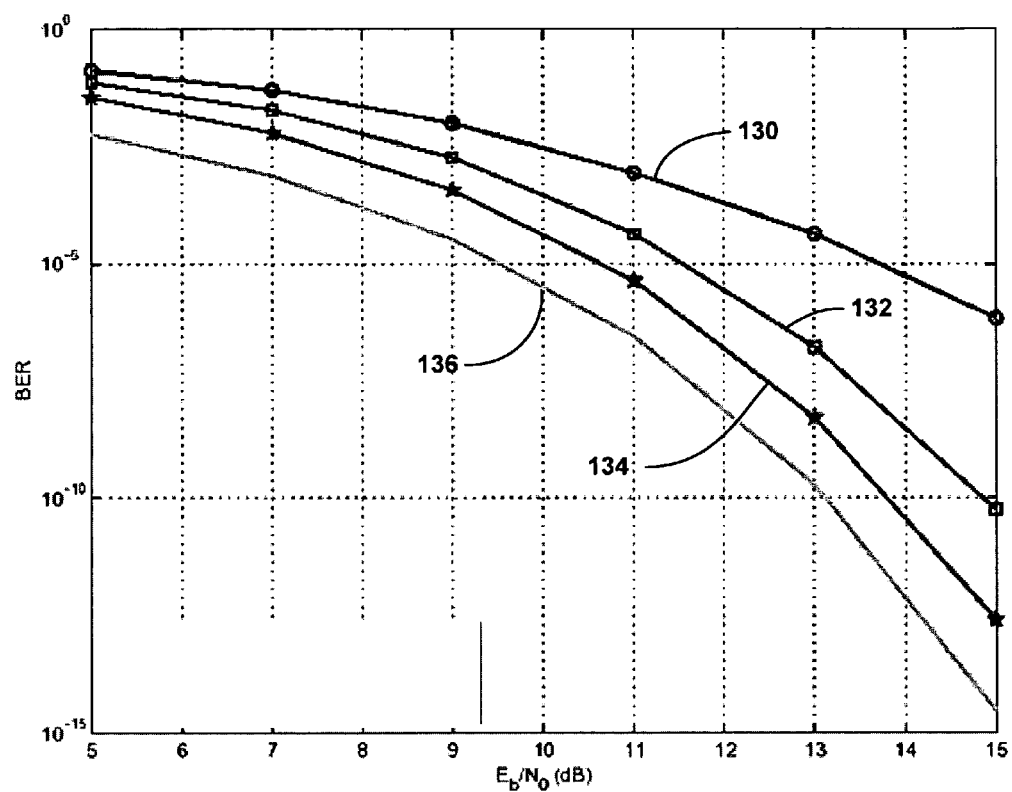

FIGS. 6 and 7 are graphs illustrating timing acquisition and BER performance across SNR in the absence of ISI and MUI, respectively. FIGS. 8 and 9 are graphs illustrating timing acquisition and BER performance across SNR with MUI but without ISI, respectively. To avoid ISI, we select $T_f$=30 ns, $N_f$=10, $T_c$=3 ns, and $c_9$=0 and the spreading codes $\{c_k\}_{k=0}^{8}$ are randomly generated taking values from $\{0, 1, \ldots, 9\}$. Equations (11) and (12) were implemented with M=2 and N=100 and N=200 to generate plots 100 and 102 respectively, for FIG. 6. The dotted lines of plots 100 and 102 represent the mean of the timing offset while the solid line represents the standard deviation.

For the DD algorithms, the initial timing and SAT estimates were acquired using equations (6), (11), and (12) with $N=N_1$=100. Subsequently, equations (32-35) were employed with $N=N_2$=100 additional periods to improve the timing and SAT estimates in a DD mode. The dotted line of plot 104 illustrates the mean for $N_1$=100 while the dashed line illustrates the mean for the additional $N_2$=100 iterations. The solid line of plot 104 corresponds to the standard deviation for the DD algorithm.

With respect to FIG. 7, plots 110, 112, 114, 116, and 118 correspond to a non-DD algorithm with N=100, a non-DD algorithm with N=200, a non-DD algorithm with N=400, a DD algorithm with $N_1$=100 and $N_2$=200, and a known channel, respectively. Because plot 114 coincides with plot 116 support is provided for the claim that DD algorithms increase the SNR. For example, with θ=3, the DD algorithm in equation (33) increases the SNR by a factor of $[(\theta+1)/(\theta-1)]^2$=4.

With respect to FIG. 8, equations (11) and (12) were implemented as described with and N=100 and N=200 to generate plots 120, and 122 respectively. The dotted lines of plots 120 and 122 represent the mean of the timing offset while the solid line represents the standard deviation. Plot 124 was generated using equations (6), (11), and (12) to simulate initial timing and SAT estimates with N=$N_1$=100. Equations (32-35) were employed with N=$N_2$=100 additional periods to improve the timing and SAT estimates in a DD mode. The dotted line of plot 124 illustrates the mean after the additional periods while the solid line corresponds to the standard deviation for the DD algorithm.

With respect to FIG. 9, plots 130, 132, 134, and 136 correspond to a non-DD algorithm with N=100, a non-DD algorithm with N=200, a DD algorithm with $N_1$=100 and $N_2$=200, and a known channel, respectively.

Figure 10:
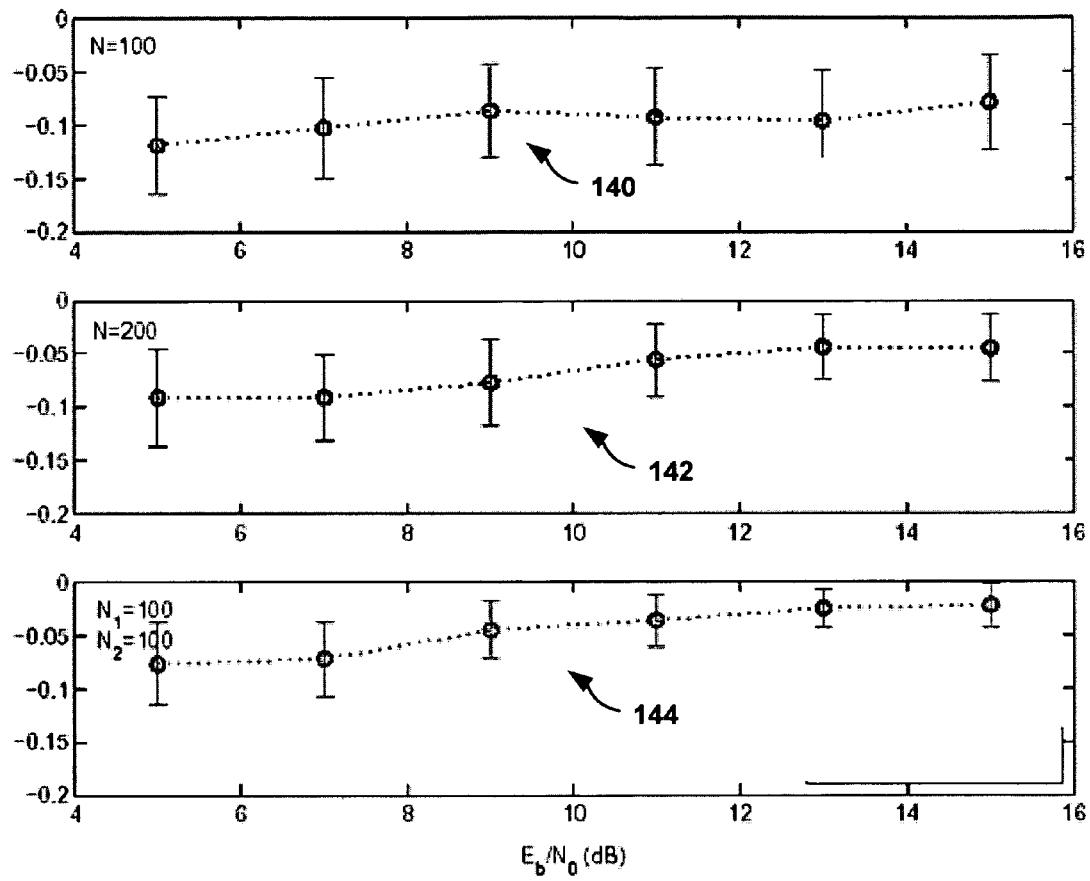
Figure 11:
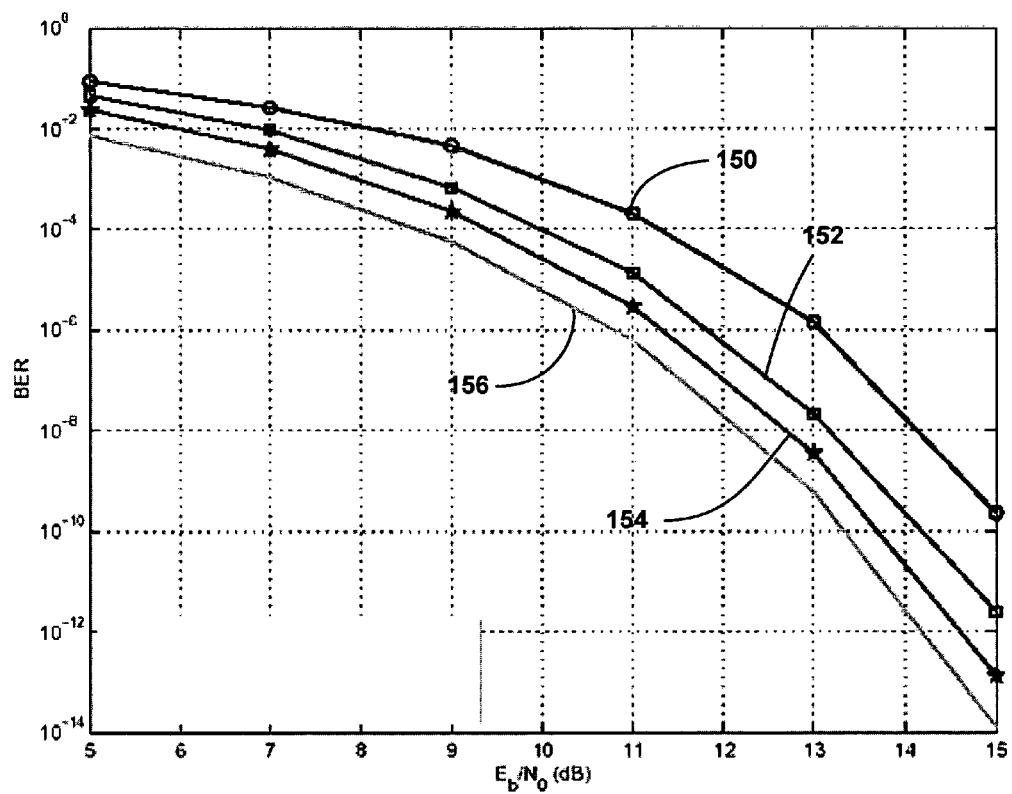
Figure 12:
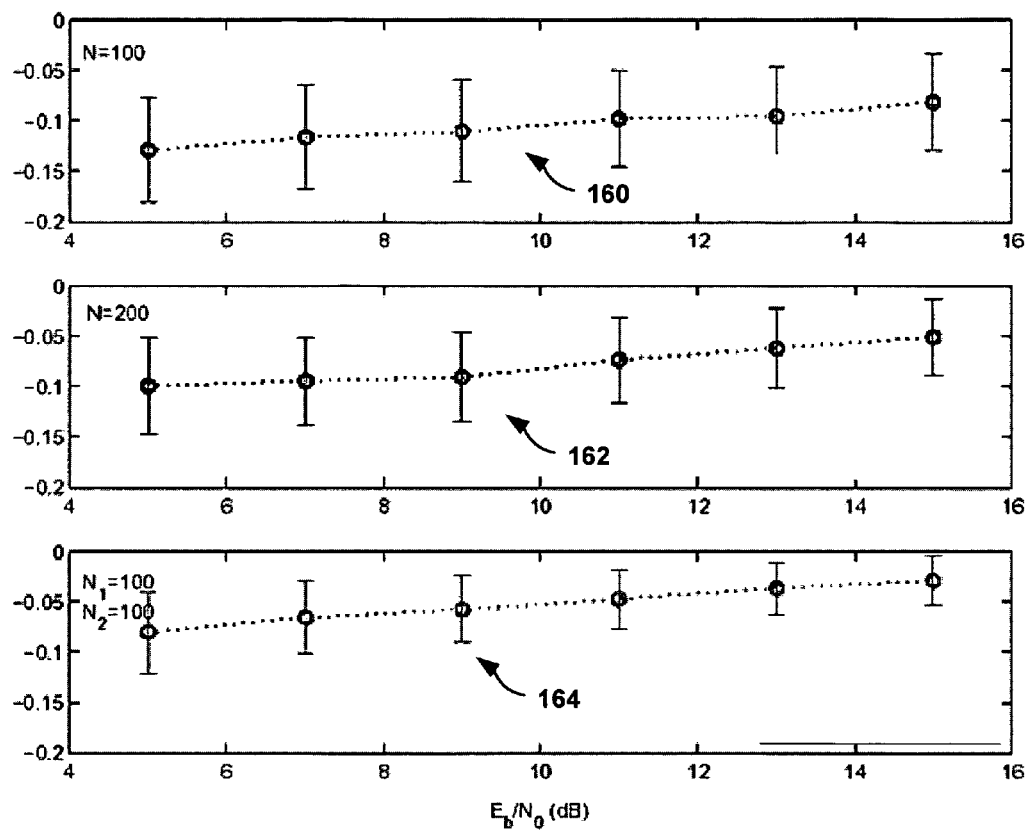
Figure 13:
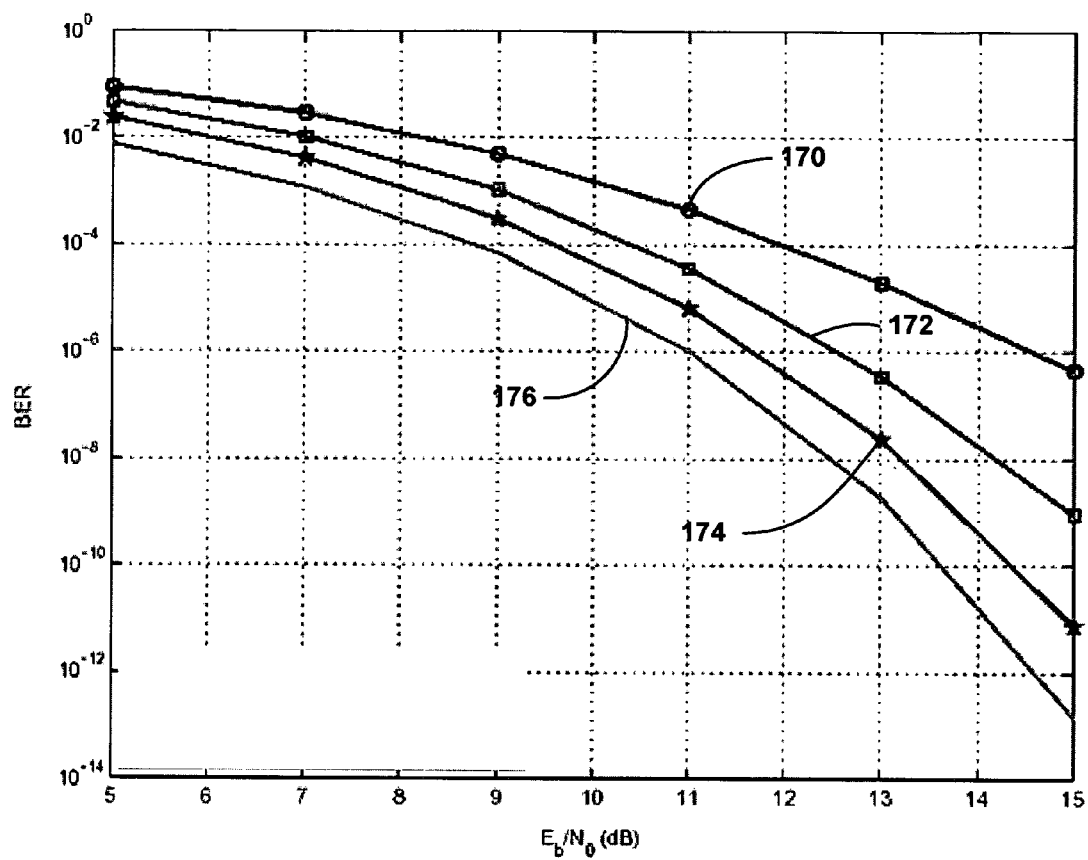

FIGS. 10 and 11 and graphs illustrating timing acquisition and BER performance with ISI but without MUI, respectively. FIGS. 12 and 13 are graphs illustrating timing acquisition and BER performance with MUI and ISI, respectively. In FIGS. 10-13, the spreading codes are generated as in FIGS. 6-9, but $T_f$=10 ns, $N_f$=10, and $T_c$=1 ns to induce ISI. In this case, equations (11) and (12) are implemented using M=3 in C2 to generate FIGS. 10-13.

With respect to FIG. 10, equations (11) and (12) were implemented as described with N=100 and N=200 to generate plots 140, and 142 respectively. The dotted lines of plots 140 and 142 represent the mean of the timing offset while the solid line represents the standard deviation. Plot 144 was generated using equations (6), (11), and (12) to simulate initial timing and SAT estimates with N=$N_1$=100. Equations (32-35) were employed with N=$N_2$=100 additional periods to improve the timing and SAT estimates in a DD mode. The dotted line of plot 144 illustrates the mean after the additional periods while the solid line corresponds to the standard deviation for the DD algorithm.

With respect to FIG. 11, plots 150, 152, 154, and 156 correspond to a non-DD algorithm with N=100, a non-DD algorithm with N=200, a DD algorithm with $N_1$=100 and $N_2$=200, and a known channel, respectively.

With respect to FIG. 12, equations (11) and (12) were implemented as described with N=100 and N=200 to generate plots 160 and 162 respectively. The dotted lines of plots 160 and 162 represent the mean of the timing offset while the solid line represents the standard deviation. Plot 164 was generated using equations (6), (11), and (12) to simulate initial timing and SAT estimates with N=$N_1$=100. Equations (32-35) were employed with N=$N_2$=100 additional periods to improve the timing and SAT estimates in a DD mode. The dotted line of plot 164 illustrates the mean after the additional periods while the solid line corresponds to the standard deviation for the DD algorithm.

With respect to FIG. 13, plots 170, 172, 174, and 176 correspond to a non-DD algorithm with N=100, a non-DD algorithm with N=200, a DD algorithm with $N_1$=100 and $N_2$=200, and a known channel, respectively.

Figure 14:
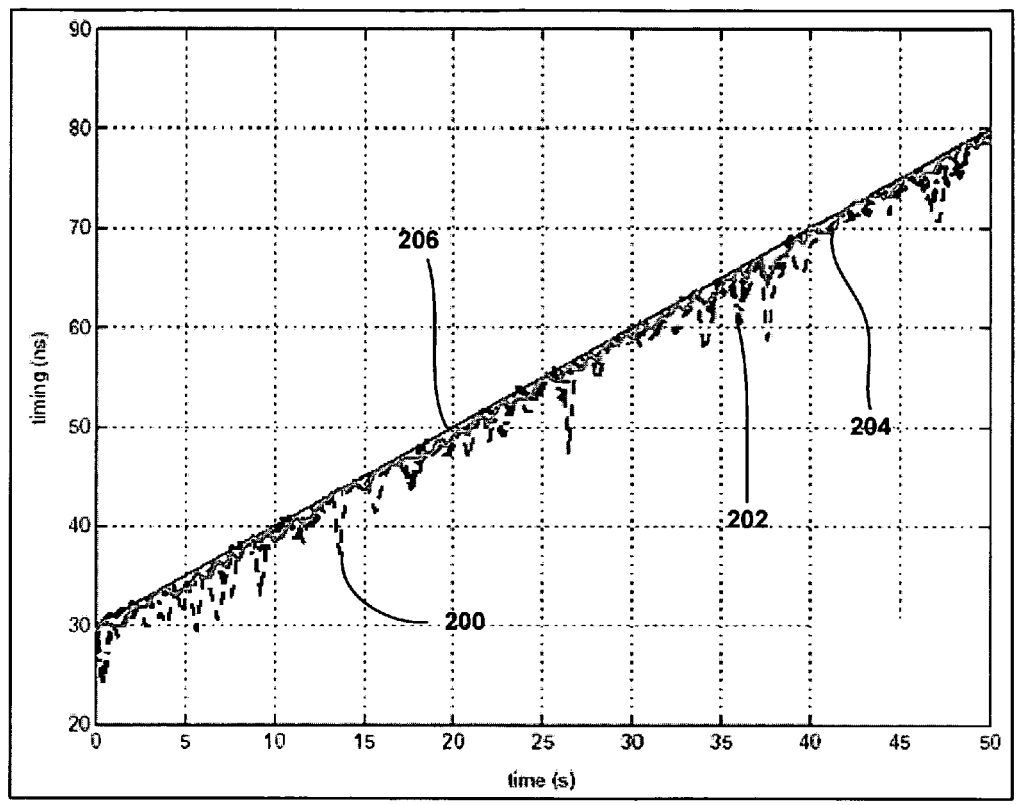

Thus, the simulations provided in FIGS. 6-13 verify that with reasonable averaging N, the described SAT receiver will be only approximately 1-2 dB away from the clairvoyant receiver, i.e., a receiver with perfectly known timing and channel FIG. 14 is a graph illustrating BER performance of DD tracking algorithms for the block-adaptive DD timing estimator in equations (27-30). In the illustrated example, $T_f$=30 ns, $N_f$=10, $T_c$=3 ns, and $c_9$=0 and the random time hopping codes are generated as previously described. MUI is not considered although the DD tracking algorithms been successfully tested with MUI. The anticipated speed of moving users in a typical UWB scenario is about v=1 m/s, which implies that the rate of channel variation is upper bounded by 3 ns per second. With maximum carrier frequency $f_c$=6 GHz, the maximum Doppler spread is $f_D$=v/(c/$f_c$)=(6×$10^9$)/(3.0×$10^8$)=20 Hz. As a result, the channel coherence time is approximately $T_{coh}$=0.423/$f_D$=21 milliseconds, which corresponds to approximately $\lceil T_{coh}/T_s \rceil$=70,000 symbols.

In particular, plots 200, 202, and 204 correspond to simulations with K=100, 200, and 400 and bit-energy-to-noise ratio 20 dB. Thus, FIG. 14 shows that it suffices to perform timing and SAT updates, based on equations (27-30) only once every $K_{coh}$=$\lceil T_{coh}/T_s \rceil$=70,000 symbols.

Various embodiments of the invention have been described. These and other embodiments are within the scope of the following claims.

The invention claimed is:

1. A method comprising:
processing a data stream of information-bearing symbols to form nonzero mean symbols and zero mean symbols, wherein the nonzero mean symbols are selected from a nonzero mean constellation, and wherein the zero mean symbols are selected from a zero mean constellation;
transmitting at least one of the nonzero mean symbols with a predetermined period in a first stream of zero mean symbols through a communication channel during a synchronization phase, wherein the first stream of zero mean symbols comprises a plurality of the zero mean symbols, and wherein the predetermined period comprises an integer M;
forming, with a transmitter device, the information-bearing symbols during the synchronization phase with symbol means determined according to the following equation:

$$E[s(kM+m)]=\mu_0\delta(m),\mu_0\neq 0 m\in[0,M-1],$$

where $\mu_o$ represents a nonzero mean value, k is a non-negative integer, s(kM+m) represents the (kM+m)th information-bearing symbol, and $\delta(m)$ represents a discrete-time unit impulse function evaluated at m; and
transmitting a second stream of zero mean symbols through the communication channel outside of the synchronization phase.

2. The method of claim 1, further comprising transmitting the information-bearing symbols as one of a narrowband waveform, a wideband waveform, or an ultra wideband waveform.

3. The method of claim 1, further comprising transmitting the information-bearing symbols in one of a fixed network or an ad hoc network.

4. The method of claim 1, further comprising transmitting the information-bearing symbols in a network that provides one of single-user access or multi-user access.

5. The method of claim 1, further comprising selecting the predetermined period based on a known upper bound of a receiver's nonzero support, wherein the receiver receives the transmitted nonzero mean symbols and zero mean symbols.

6. The method of claim 1, further comprising:
receiving a waveform through a wireless communication channel during the synchronization phase, wherein the received waveform comprises a periodic the at least one of the nonzero mean symbols in the first stream of zero mean symbols;
detecting energy of an average of the received waveform to form an estimate of the timing offset of the received waveform;

estimating a synchronized aggregate template (SAT) based on the estimated timing offset; and outputting a stream of symbol estimates in accordance with the estimated timing offset.

7. The method of claim 6, further comprising forming an estimate of the timing offset substantially according to the following equation:

$$\hat{\tau}_0 = \arg\max_{\tau \in [0, MT_s)} \int_0^{T_R} \bar{r}^2((t+\tau)_{mod\ MT_s}) dt,$$

where M comprises a predetermined period of the nonzero mean symbols in the received waveform, $T_s$ comprises a symbol duration, $T_R$ comprises a duration of the received waveform, and $\bar{r}(t)$ comprises a mean-square sense (mss) average of the received waveform.

8. The method of claim 7, further comprising estimating the SAT substantially according to the following equation:

$$\hat{p}_R(t) = \frac{1}{\sqrt{\varepsilon}} \frac{1}{\mu_0} \bar{r}(t+\hat{\tau}_0), t \in [0, T_R],$$

where $\in$ comprises energy per symbol and $\mu_0$ comprises the nonzero mean value.

9. The method of claim 8, wherein outputting the stream of symbol estimates comprises estimating the symbols of the received waveform, r(t), with a SAT-based demodulator substantially according to the following equation:

$$\hat{s}(k) = \text{sign}\left[\int_0^{T_R} \hat{p}_R(t) r(t+\tau_0+kT_s) dt\right],$$

when interference and noise are absorbed into a single noise term.

10. The method of claim 6, wherein outputting the stream of symbol estimates comprises estimating the symbols of the received waveform with a SAT-based demodulator.

11. The method of claim 6, further comprising tracking the estimated timing offset and the estimated SAT during the synchronization phase with low-complexity decision-directed (DD) tracking schemes.

12. The method of claim 6, further comprising:
receiving a waveform through the wireless communication channel outside of the synchronization phase, wherein the received waveform comprises the second stream of zero mean symbols; and
outputting a stream of symbol estimates in accordance with the timing offset estimated during the synchronization phase.

13. The method of claim 12, further comprising tracking the estimated timing offset and the estimated SAT outside of the synchronization phase with decision-directed (DD) tracking schemes.

14. The method of claim 6, wherein the received waveform comprises one of a narrowband waveform, a wideband waveform, or an ultra wideband (UWB) waveform.

15. The method of claim 6, further comprising receiving the waveform from one of a fixed network or an ad hoc network.

16. The method of claim 6, further comprising receiving the waveform from a network that provides one of single-user access or multi-user access.

17. A device comprising:
a pulse generator that processes a data stream of information-bearing symbols to form nonzero mean symbols and zero mean symbols, wherein the nonzero mean symbols are selected from a nonzero mean constellation, and wherein the zero mean symbols are selected from a zero mean constellation; and one or more antennas to periodically transmit at least one of the nonzero mean symbols with a predetermined period in a first stream of zero mean symbols during a synchronization phase, and to transmit a second stream of zero mean symbols outside of the synchronization phase, wherein the first stream of zero mean symbols comprises a plurality of the zero mean symbols, wherein the predetermined period comprises an integer M, and wherein the pulse generator forms information-bearing symbols during the synchronization phase with symbol means determined according to the following equation:

$$E[s(kM+m)] = \mu_0 \delta(m), \mu_0 \neq 0\ m \in [0, M-1],$$

where $\mu_o$ represents a nonzero mean value, k is a non-negative integer, s (kM+m) represents the (kM+m)th information-bearing symbol, and δ(m) represents a discrete-time unit impulse function evaluated at m.

18. The device of claim 17, further comprising a pulse shaping unit that generates one of a narrowband waveform, a wideband waveform, or an ultra wideband (UWB) waveform from the information-bearing symbols.

19. The device of claim 17, wherein the antenna transmits the symbols in one of a fixed network or an ad hoc network.

20. The device of claim 17, wherein the antenna transmits the symbols in a network that provides one of single-user access or multi-user access.

21. The device of claim 17, wherein the pulse generator selects the predetermined period based on a known upper bound of the receiver's nonzero support.

22. The device of claim 17, further comprising:
an antenna to receive a waveform through a wireless communication channel during the synchronization phase, wherein the received waveform comprises a periodic the at least one of the nonzero mean information bearing symbols in the first stream of zero mean symbols;
an energy unit to detect energy of an average of the received waveform to form an estimate of the timing offset of the received waveform;
a template unit to estimate a synchronized aggregate template (SAT) based on the estimated timing offset; and
a symbol detector to output a stream of symbol estimates from the received waveform in accordance with the estimated timing offset.

23. The device of claim 22, wherein the energy unit forms an estimate of the timing offset substantially according to the following equation:

$$\hat{\tau}_0 = \arg\max_{\tau \in [0, MT_s)} \int_0^{T_R} \bar{r}^2((t+\tau)_{modMT_s}) dt,$$

where M comprises a predetermined period of the nonzero mean symbols in the received waveform, $T_s$ comprises a symbol duration, $T_R$ comprises a duration of the received waveform, and $\bar{r}(t)$ comprises the mean-square sense (mss) average across the received waveform.

24. The device of claim 23, wherein the template unit estimates the SAT substantially according to the following equation:

$$\hat{p}_R(t) = \frac{1}{\sqrt{\varepsilon}} \frac{1}{\mu_0} \bar{r}(t+\hat{\tau}_0), t \in [1, T_R],$$

where $\varepsilon$ comprises energy per symbol and $\mu_0$ comprises the nonzero mean value.

25. The device of claim 24, wherein the symbol detector estimates the symbols of the received waveform, r(t), with a SAT-based demodulator substantially according to the following equation:

$$\hat{s}(k) = \text{sign}\left[\int_0^{T_R} \hat{p}_R(t) r(t+\tau_0+kT_s) dt\right],$$

when interference and noise are absorbed into a single noise term.

26. The device of claim 22, wherein the symbol detector estimates the symbols of the received waveform with a SAT-based demodulator.

27. The receiver device of claim 22, further comprising a tracking unit to track the estimated timing offset and the estimated SAT during the synchronization phase with low-complexity decision-directed (DD) tracking schemes.

28. The receiver device of claim 22, further comprising:
an antenna to receive a waveform through the wireless communication channel outside of the synchronization phase, wherein the received waveform comprises the second stream of zero mean symbols; and
a symbol detector to output a stream of symbol estimates in accordance with the timing offset estimated during the synchronization phase.

29. The device of claim 28, further comprising a tracking unit to track the estimated timing offset and the estimated SAT outside of the synchronization phase with decision-directed (DD) tracking schemes.

30. The receiver device of claim 22, wherein the received waveform comprises one of a narrowband waveform, a wideband waveform, or an ultra wideband (UWB) waveform.

31. The receiver device of claim 22, wherein the antenna receives the waveform from one of a fixed network or an ad hoc network.

32. The receiver device of claim 22, wherein the antenna receives the waveform from a network that provides one of single-user access or multi-user access.

33. A non-transitory computer readable medium comprising instructions that when executed in a transmitter:
process a data stream of information-bearing symbols to form nonzero mean symbols and zero mean symbols, wherein the nonzero mean symbols are selected from a nonzero mean constellation, and wherein the zero mean symbols are selected from a zero mean constellation;
periodically transmit at least one of the nonzero mean symbols with a predetermined period in a first stream of zero mean symbols transmitted through a communication channel to a receiver during a synchronization phase, wherein the first stream of zero mean symbols comprises a plurality of the zero mean symbols, and wherein the predetermined period comprises an integer M;
form the information-bearing symbols during the synchronization phase with symbol means determined according to the following equation:

$E[s(kM+m)] = \mu_0 \delta(m), \mu_0 \neq 0 m \in [0, M-1],$ where $\mu_o$ represents a nonzero mean value, k is a non-negative integer, s (kM+m) represents the (kM+m)th information-bearing symbol, and $\delta(m)$ represents a discrete-time unit impulse function evaluated at m; and
transmit a second stream of zero mean information-bearing symbols through the communication channel outside of the synchronization phase.

34. The non-transitory computer readable medium of claim 33, further comprising instructions that when executed select the predetermined period based on a known upper bound of the receiver's nonzero support.

35. The non-transitory computer-readable medium of claim 24, further comprising instructions that when executed in a receiver:
receive a waveform through a wireless communication channel during the synchronization phase, wherein the received waveform comprises a periodic the at least one of the nonzero mean symbols in the first stream of zero mean symbols;
detect energy of an average of the received waveform to form an estimate of the timing offset of the received waveform;
estimate a synchronized aggregate template (SAT) based on the estimated timing offset; and
output a stream of symbol estimates from the received waveform in accordance with the estimated timing offset.

* * * * *